United States Patent [19]

Iwase et al.

[11] Patent Number: 6,038,350

[45] Date of Patent: Mar. 14, 2000

[54] SIGNAL PROCESSING APPARATUS

[75] Inventors: Seiichiro Iwase; Masuyoshi Kurokawa; Takao Yamazaki, all of Kanagawa; Mitsuharu Ohki, Tokyo, all of Japan

[73] Assignee: Sony Corporation, Japan

[21] Appl. No.: 09/228,237

[22] Filed: Jan. 11, 1999

Related U.S. Application Data

[62] Division of application No. 08/731,161, Oct. 10, 1996, Pat. No. 5,926,583.

[30] Foreign Application Priority Data

Oct. 12, 1995 [JP] Japan .............................. PO7-290300

[51] Int. Cl.[7] .............................. G06K 9/36; G06K 9/54; G06K 9/60; H04N 7/12; H04N 1/40
[52] U.S. Cl. .......................... 382/304; 382/250; 382/303; 348/422; 348/721; 358/443; 358/447; 364/133
[58] Field of Search ..................................... 382/303, 250, 382/304; 358/443, 447; 348/721, 422; 364/133, 134

[56] References Cited

U.S. PATENT DOCUMENTS

| | | | |
|---|---|---|---|
| 4,674,064 | 6/1987 | Vaughn ...................................... | 710/71 |
| 4,791,677 | 12/1988 | Mori et al. ............................... | 382/304 |
| 5,031,037 | 7/1991 | Israelsen ................................. | 348/422 |
| 5,093,722 | 3/1992 | Miyaguchi et al. .................... | 348/441 |
| 5,309,527 | 5/1994 | Ouki ........................................ | 382/250 |
| 5,689,592 | 11/1997 | Ericsson et al. ........................ | 382/304 |

*Primary Examiner*—Leo H. Boudreau
*Assistant Examiner*—Daniel G. Mariam
*Attorney, Agent, or Firm*—Rader, Fishman & Grauer; Ronald P. Kananen

[57] ABSTRACT

A multiple parallel digital signal processor having a large number of bit processing processor elements arranged in one-dimensional array is treated as a processor block, and a plurality of the processor blocks are connected in sequence, while removing redundancy, to form a processor block column. A plurality of processor blocks are connected in sequence such that a processor block at a subsequent stage is supplied either with output of a processor block at a previous stage or with input data, and any of outputs of the processor block columns is delivered as a final output, thereby making it possible to realize a signal processing apparatus which has high performance, versatility, and simple configuration.

13 Claims, 16 Drawing Sheets

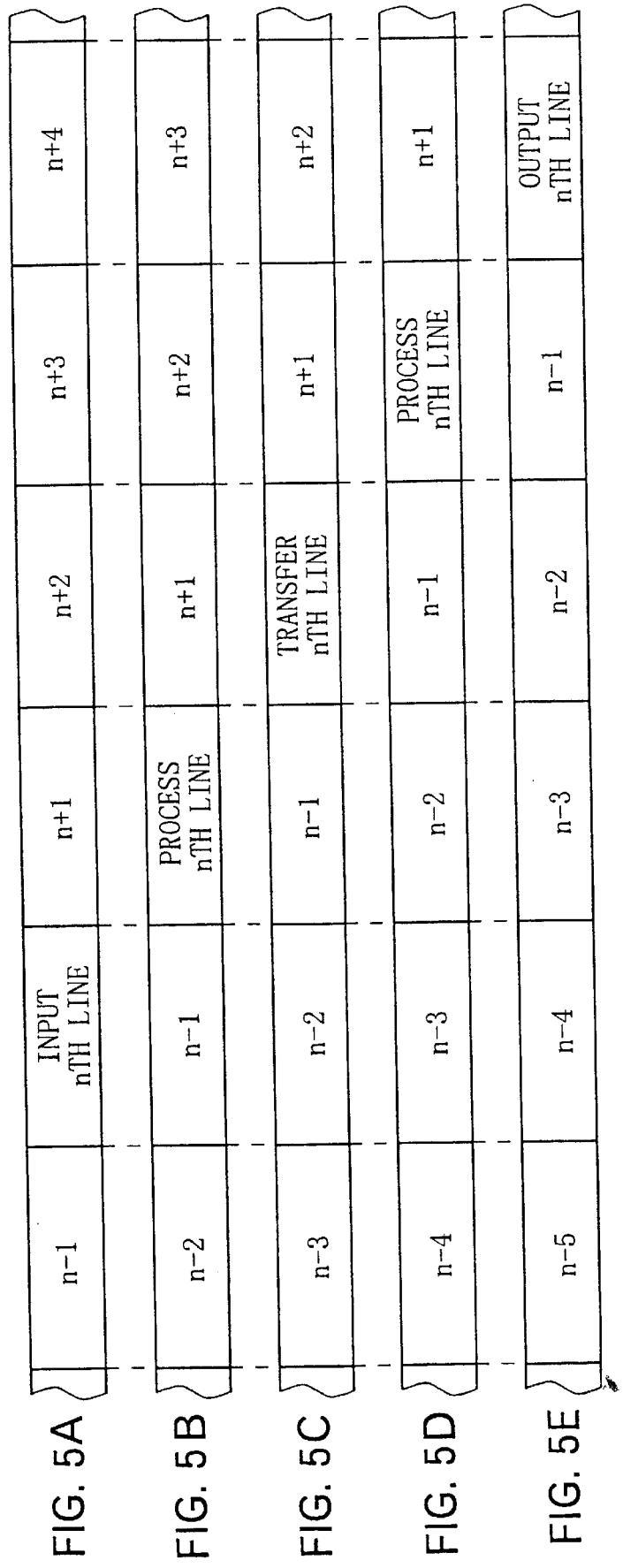

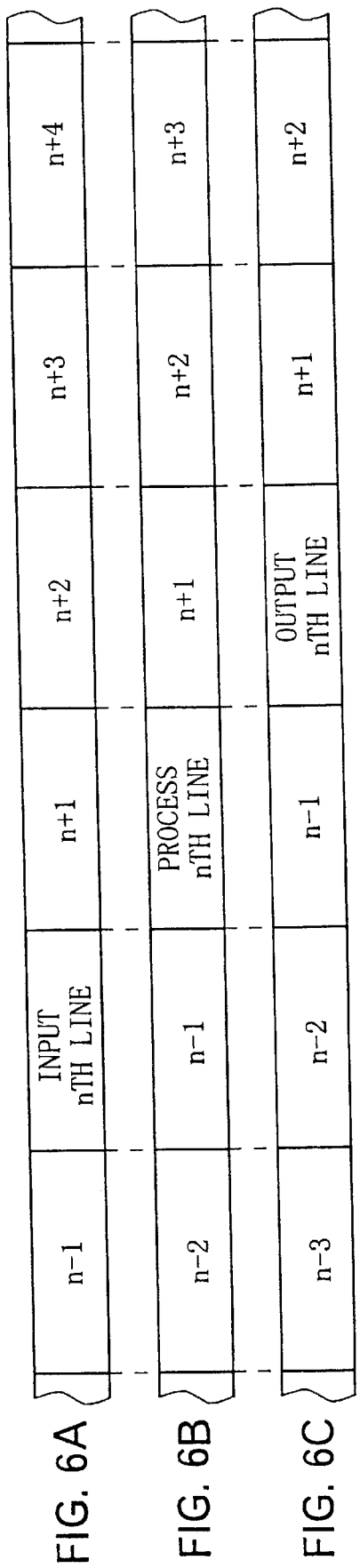

FIG. 7A

| B/n-1 | nTH LINE OF IMAGE A | nTH LINE OF IMAGE B | A/n+1 | B/n+1 | A/n+2 | B/n+2 | A/n+3 | B/n+3 | A/n+4 | B/n+4 |

FIG. 7B

| n-2 | n-1 | PROCESS nTH LINE | n+1 | n+2 | n+3 |

FIG. 7C

| A/n-3 | B/n-3 | A/n-2 | B/n-2 | A/n-1 | B/n-1 | | A/n+1 | B/n+1 | A/n+2 | B/n+2 |

SIGNAL PROCESSING APPARATUS

This application is a divisional of application Ser. No. 08/731,161 filed Oct. 10, 1996, U.S. Pat. No. 5,926,583.

BACKGROUND OF THE INVENTION

1. Field of the Invention

The present invention relates to signal processing apparatuses, and more particularly to an improvement of DSP-LSI (Digital Signal Processor - Large Scale Integrated circuit), for example, incorporated in electronic equipment such as television receivers, video tape recorders, set top boxes, multimedia computers, broadcasting equipment, and so on.

2. Description of the Related Art

Conventionally, a configuration of a processor for realizing programmable digital signal processing for video signals such as television signals and so on is implemented by a linear array type processor employing an SIMD control (Single Instruction stream Multi Data stream: a parallel processing control for associatively operating all processor elements by a single program). For example, U.S. Pat. No. 4,939,575, which was issued on Jul. 3, 1990, discloses a configuration of this type of processor.

The above-mentioned processor has an operator array formed of one-bit ALUs (Arithmetic Logic Unit) incorporated in VRAM (Video RAM), as illustrated in FIG. 1. This linear array type processor is described below with reference to FIG. 1. A linear array type processor 1 is generally divided into an input SAM (serial access memory) unit 2, a data memory unit 3, an ALU array unit 4, a data memory unit 5, an output SAM unit 6, and a program control unit 7.

The input SAM unit 2, data memory unit 3, ALU array unit 4, data memory unit 5, and output SAM unit 6 constitute a group of processor elements which are arranged, as a whole, in a linear array having a large number of parallel elements. These multiple processor elements are SIMD controlled in association with each other by a common program control unit located in the program control unit 7.

The program control unit 7 includes a program memory and a sequence control circuit for stepping a program, in order to control the respective other units by a variety of control signals connected thereto in accordance with the program previously stored in the program memory. It should be noted that the input SAM unit 2, data memory unit 3, data memory unit 5, and output SAM unit 6 are basically implemented by memories, and a ROW address decoding program for these memories is assumed to be included in the program control unit 7 in FIG. 1, though detailed explanation is not given herein.

A single element portion in a large number of processor elements arranged in parallel includes a vertically extended area as indicated by hatching in FIG. 1, and such single element portions are linearly arranged in the lateral direction in the figure. In other words, the configuration of a processor as illustrated in FIG. 2, generally required to implement a single processor element, is realized by the vertically extended processor element indicated by hatching in FIG. 1.

The input SAM unit 2 corresponds to an input buffer memory (IQ) 10 in FIG. 2. The output SAM unit 6 corresponds to an output buffer memory (OQ) 11. The data memory unit 5 corresponds to a first data memory (RFB) 12. The data memory unit 3 corresponds to a second data memory (RFA) 13. The ALU array unit 4 corresponds to selectors (SEL) 14A, 14B and ALU 15 for selecting data in the first data memory 12 and the second data memory 13 and performing operations on the selected data as required.

The processor element differs from ordinary processors in that ordinary processors include a hardware configuration for word-unit processing. This processor element includes a hardware configuration for bit-unit processing. Describing the processor element with common expression for CPUs such as 8-bit machine, 16-bit machine, and so on, the processor element may be referred to as a one-bit machine. Since the bit processing processor has a small hardware scale, it can realize an extremely large number of parallelly arranged elements that cannot be realized by an ordinary processor configuration. Thus, a linear array type processor for processing images is provided with the number of parallel elements in a linear array equal to the number H of pixels in one horizontal scanning period of a video signal to be processed.

The configuration of the processor element is schematically illustrated in FIG. 3. One processor element portion in the input SAM unit 2 includes a plurality of input SAM cells 2B arranged in column for receiving a control signal from an input pointer 2A. Actually, the input SAM cells 2B equal in number to the number of bits (ISB) of an input signal DIN in FIG. 1 are arranged in column. However, FIG. 3 omits such a large number of cells and illustrates only one representative cell.

One processor element portion in the data memory unit 3 includes a number of memory cells 3A in FIG. 3 equal to the number of bits MAB in FIG. 1. Actually, the memory cells 3A equal in number to the number of bits MAB are arranged in column. However, FIG. 3 omits such a large number of cells and illustrates only one representative cell. The number MAB of memory cells are provided as work memories required for operational processing.

One processor element portion in the ALU array unit 4 includes an ALU cell 4A in FIG. 3. A net ALU portion in the ALU cell 4A is a one-bit ALU which only requires a circuit scale of a full adder. The ALU cell 4A additionally includes selector circuits SELn each for selecting an input to the ALU 4B, and so on. Each of the selectors SELn selects data from one of buses which intersect therewith at cross points indicated by a plurality of "x" marks in FIG. 3. Each data selected by each selector SELn is supplied to the ALU 4B through a one-bit register FF implemented by a flip-flop.

One processor element portion in the data memory unit 5 includes a number of memory cells 5A in FIG. 3 equal to the number of bits MBB in FIG. 1. Actually, the memory cells 5A equal in number to the number of bits MBB are arranged in column. However, FIG. 3 omits such a large number of cells and illustrates only one representative cell. The number MBB of memory cells are provided as work memories required for operational processing. The memory cell 5A may be common to the memory cell 3A.

One processor element portion in the output SAM unit 6 includes a plurality of output SAM cells 6B arranged in column which receive a control signal from an output pointer 6A. Actually, the output SAM cells 6B equal in number to the number of bits (OBB) of an input signal in FIG. 1 are arranged in column. However, FIG. 3 omits such a large number of cells and illustrates only one representative cell.

An input SAM read signal $S_{IR}$, memory access signals $S_{AA}$ and $S_{AB}$, and an output SAM write signal $S_{OW}$ are conducted on word lines of the memory cells. The word lines laterally pass through the cells and connect identical circuit elements arranged in the lateral direction in a similar manner. It is assumed that the addresses have been decoded for these word lines of memory cells. Also, for a read modify write operation, a read signal is generated in the former half of a cycle and a write signal in the latter half of the cycle.

Also in FIG. 3, connection lines vertically passing through the cells, i.e., bit lines and pointer signal lines pass therethrough as they connect circuit elements arranged in the vertical direction in a similar manner. An input data bus passes through identical circuit elements arranged in the lateral direction, i.e., the input SAM cells 2B as it connects them in a similar manner. An output data bus passes through identical circuit elements arranged in the lateral direction, i.e., the output SAM cells 6B as it connects them in a similar manner.

Next, the operation of the processor will be described with reference to FIGS. 1 and 3. Input data $D_{IN}$ composed of pixel data of a video signal is led to the input SAM unit 2 through the input data bus. The input pointer 2A generates a one-bit signal, i.e., an input pointer signal $S_{IP}$ at logical "H" only for a single processor element such that the input data DIN is written into the input SAM cell 2B of the processor element specified by the input pointer signal at logical "H".

In the input SAM cell 2B specified by the pointer 2A, a transistor Tr1 turns on to charge a capacitor C1 to a potential corresponding to the input signal $D_{IN}$. It should be noted that while the actual processor includes a number of the input data buses and input SAM cells 2B equal to the number of bits of input signal DIN (ISB), FIG. 3 only illustrates a one-bit portion of these circuit components.

The input pointer signal $S_{IP}$ at logical "H" is sequentially shifted from the leftmost processor element to the rightmost processor element every one horizontal scanning period of the video signal, such that the input data $D_{IN}$ can be stored in the input SAM cell 2B in the leftmost processor element and sequentially in the input SAM cells 2B in the processor elements on the right side up the respective previous processor elements. Since the number of the laterally arranged processor elements is equal to the number H of pixels of the video signal in one horizontal scanning period, the video signal is continuously written into the SAM cells 2B in the right direction during one horizontal scanning period with a clock commensurate with the data rate of the input video signal. Thereby, the input data DIN of one horizontal scanning period portion can be accumulated in the input SAM unit 2. This input operation is repeated every horizontal scanning period.

Every time the data including one horizontal scanning period portion of the video signal is accumulated in the input SAM unit 2 as described above, the program control unit 7 SIMD controls the input SAM unit 2, data memory unit 3, ALU array unit 4, data memory unit 5, and output SAM unit 6 in the following manner to execute the processing. This program control is repeated every horizontal scanning period. In other words, the program control unit 7 can provide a program having a number of steps calculated by dividing the horizontal scanning period by the instruction cycle period of the processor. Since the SIMD control is performed, the following operations are all executed in all the processor elements at the same time.

The one horizontal scanning portion of input data DIN accumulated in the input SAM unit 2 is transferred from the input SAM unit 2 to the data memory unit 5 under the control of the program control unit 7, as required, during the next horizontal scanning period and then used for operational processing. The transfer of the input data DIN from the input SAM unit 2 to the data memory unit 5 is realized by a program which selects required bits stored in the input SAM unit 2 by the input SAM read signal $S_{IR}$ and generates the memory access signal $S_{AB}$ to predetermined memory cells 5A in the destination data memory unit 5 to write the selected bits thereinto.

While the input SAM read signal $S_{IR}$ and the memory access signal $S_{AB}$ are included in word lines and there are pluralities of the input SAM read signal $S_{IR}$ and the memory access signals $S_{AB}$, they have been decoded by address decoders. Also, for a read modify write operation, a read signal is generated in the former half of a cycle and a write signal in the latter half of the cycle.

In an input SAM cell 2B selected by the input SAM read signal $S_{IR}$, a transistor Tr2 turns on in the former half of a cycle, so that a transfer data signal corresponding to a potential on the capacitor C1 occurs on an upper bit line which vertically passes through the input SAM cell 2B. This data transfer is performed one bit per cycle through the vertical bit line. During the data transfer, the transferred data is passed through the ALU cell 4A although the ALU 4B has nothing to process the transferred data. In other words, each selector SEL selects a path such that transferred data passes through the ALU 4B, while a no-operation instruction is generated to the ALU 4B. Then, the ALU output control signal $S_{BB}$ is generated at predetermined timing to turn on a transistor Tr5 to output an ALU output onto a lower bit line in the latter half of the cycle.

A transistor Tr6 in a predetermined memory cell 5A in the data memory unit 5 selected by the memory access signal $S_{AB}$ is turned on in the latter half of the cycle to charge a capacitor C3 to a potential corresponding to the transferred data so that the transferred data having passed through the ALU 4B is stored in the memory cell 5A.

The read signal $S_{IR}$ from each input SAM cell 2B in the input SAM unit 2 and the memory access signal $S_{AA}$ to each memory cell 3A in the data memory unit 3 are located in the same address space, decoded by the same ROW decoder for the memories, and delivered onto word lines.

For processing the data, the memory access signals $S_{AA}$, $S_{AB}$ are first generated to predetermined memory cells in the data memory unit 3 and the data memory unit 5, as required, to read and write data in order to move the data therebetween, as a preoperative operation for the data processing.

For example, if data is to be transferred from the data memory unit 5 to the data memory unit 3, the read memory access signal $S_{AB}$ is outputted to a predetermined memory cell 5A in the data memory unit 5 to turn the transistor Tr6 on during the former half of a cycle. Thus, data to be transferred, corresponding to a potential on the capacitor C3, is outputted onto a lower bit line. Then, the ALU array unit 4 is controlled to pass the transferred data through the ALU cell 4A, although the ALU 4B does not perform any processing on the transferred data, in a manner similar to the data transfer from the input SAM unit 2 to the data memory unit 5. Next, the ALU output control signal $S_{BA}$ is generated at predetermined timing to turn a transistor Tr4 on to output the transferred data onto an upper bit line during the latter half of the cycle. Then, a write memory access signal $S_{AA}$ is outputted to a predetermined memory cell 3A in the data memory unit 3 to turn the transistor Tr3 on during the latter half of the cycle, thereby charging the capacitor C2 to a potential corresponding to the transferred data.

In this way, the input data $D_{IN}$ which has been written in the past as described above and data in the middle of operation are stored in the data memory unit 3 and the data memory unit 5. These data or data stored in the one-bit registers FF in the ALU cell 4A are used to sequentially advance required bit-by-bit operational processing in the ALU 4B.

For example, for adding data in a memory cell 3A of a bit in the data memory unit 3 and data in a memory cell 5A of a bit in the data memory unit 5, and writing the addition result into the memory cell 5A from which the bit of the data memory unit 5 has been read, the following processing is performed.

First, in the former half of a cycle, the read signal $S_{AA}$ is outputted to a memory cell 3A associated with a predetermined bit of the data memory unit 3, and the read signal $S_{AB}$ is outputted to a memory cell 5A associated with a predetermined bit of the data memory unit 5. As a result, transistors Tr3 and Tr6 in both the memory cells are turned on and data stored therein are outputted onto respective bit lines.

The data read from the data memory unit 3 and the data read from the data memory unit 5 pass through a predetermined path selected by the selector SEL in the ALU array unit 4 and in the ALU 4B, an addition is performed. The output from the ALU 4B generates an ALU output control signal $S_{BB}$ at predetermined timing to turn the transistor Tr5 on to output it onto a lower bit line in the latter half of the cycle as the resultant data. Then, the write memory access signal $S_{AB}$ is outputted to a predetermined memory cell 5A in the data memory unit 5 to turn the transistor Tr6 on in the latter half of the cycle, charging the capacitor C3 to a potential corresponding to the data outputted from the ALU 4B.

The processing operation in the ALU cell 4A is specified from a program by an ALU control signal $S_{ALU-COUNT}$. The result of the operation performed in the ALU cell 4A may be again written into the data memory unit 3 or into the data memory unit 5, or stored in a one-bit register FF in the ALU cell 4A as required. In the case of addition, generally, a carry is stored in the one-bit register FF, while the sum is stored in the data memory unit 5.

In this way, necessary arithmetic operations or logical operations are performed in the ALU array unit 4 in each time when data are read from the data memory unit 3 and the data memory unit 5, which are located above and below the ALU cell 4A, in accordance with the program. The operation data may be again written into a predetermined address in the data memory unit 3 or the data memory unit 5. The operational processing is fully performed on a bit-by-bit basis, and the processing is advanced one bit per cycle.

When the operational processing to be conducted during one horizontal scanning period has been completed, the processed output data in the horizontal scanning period must be transferred to the output SAM unit 6 in a last portion of the program within the same horizontal scanning period.

If data to be outputted is located in a predetermined memory cell 3A of the data memory unit 3, the memory access signal $S_{AA}$ is outputted to the memory cell 3A in the former half of a cycle to read the data. Then, the write signal $S_{OW}$ is generated to an output SAM cell 6B in the latter half of the cycle such that the read data is passed through the ALU array unit 4 and transferred to the output SAM cell 6B with a predetermined bit in the output SAM unit 6. The data is transferred one bit by one bit through a vertical bit line. Also in this event, although the data is not performed any processing associated with the data transfer in the ALU 4B, the data is passed through the ALU cell 4A. For this operation, the ALU output control signal $S_{BB}$ is generated at predetermined timing. Since details on the operation are the same as the above, description thereon is omitted.

The write signal $S_{OW}$ to each output SAM cell 6B in the output SAM unit 6 and the memory access signal $S_{AB}$ to each memory cell 5A in the data memory unit 5 are located in the same address space, so that they are decoded by the same ROW decoder and provided on associated word lines.

As described above, the transfer of input data $D_{IN}$ accumulated in the input SAM unit 2 to the data memory units 3, 5, required data transfer between the data memory units 3, 5, required operational processing, and transfer of output data to the output SAM unit 6 are controlled during one horizontal scanning period by the bit-based SIMD control program. The processing performed by the program is repeated every horizontal scanning period. Since the processing is SIMD controlled, all the processor elements operate in association with each other to perform the same processing on the number H of pixels in one horizontal scanning period.

The output data transferred to the output SAM unit 6 when the program has completed the processing, is again outputted from the output SAM unit 6 during the next horizontal scanning period in the following manner.

The output data is led to an output data bus from the output SAM unit 6 and outputted external to the processor. The output pointer 6A generates a one-bit signal at logical "H", i.e., an output pointer signal $S_{OP}$ only to a single processor element. The output data is read onto the output data bus from an output SAM cell 6B of the processor element specified by the output pointer signal $S_{OP}$ at logical "H" and serves as output data $S_{OUT}$. While there are a number of the output data buses and the output SAM cells 6B equal to the number of bits OSB, FIG. 3 only illustrates one bit portion of these components.

In the output SAM cell 6B specified by the output pointer 6A, a transistor Tr8 turns on to generate an output signal corresponding to a potential on a capacitor C4 on the output data bus. The output pointer signal $S_{OP}$ at logical "H" is sequentially shifted from the leftmost processor element to the rightmost processor element every one horizontal scanning period of the video signal, such that the reading of the output data, beginning with the output SAM cell 6B in the leftmost processor element, is shifted sequentially to the processor elements on the right side of the respective previous processor elements. Since the number of the laterally arranged processor elements is equal to the number H of pixels of the video signal in one horizontal scanning period, the output data $D_{OUT}$ of one horizontal scanning period portion can be outputted from the output SAM unit 6 at a clock commensurate with the data rate of an output video signal. This output operation is repeated every horizontal scanning period. It should be noted that the configuration of each cell in FIG. 3 is highly generalized for facilitating the understanding.

In a program control processor, as described above with reference to FIG. 2, generally referred to as CPU or DSP, input data $D_{IN}$ is first written into a data memory unit 12 through a buffer memory 10. Then, data just inputted and written into the data memory unit 12, previously inputted data stored in the data memory unit 12 and in the data memory unit 13, previous processed data, data in the middle of processing, and so on are selected by memory addresses and the selectors 14A, 14B, thus these data are led to the ALU 15 for processing. Then the processed data are stored in the data memory unit 12 and in the data memory unit 13. Then, the processing result is outputted from the data memory unit 12 through the output buffer memory 11.

In the linear array type processor 1 illustrated in FIG. 1, the input SAM unit 2 corresponds to the input buffer memory 10; the output SAM unit 6 to the output buffer memory 11; the data memory unit 5 to the data memory unit 12; the data memory unit 3 to the data memory 13; and the ALU array unit 4 to the selectors 14A, 14B and the ALU 15, respectively.

In the linear array type processor 1, an input operation by writing input data $D_{IN}$ into the input SAM unit 2 is designated a first operation; transfer of the input data $D_{IN}$ accumulated in the input SAM unit 2 into the data memory units 3, 5, required data transfer between the data memory units 3, 5, required operational processing, and transfer of output data $D_{OUT}$ to the output SAM unit 6 are collectively designated a second operation; and an output operation by reading the output data $D_{OUT}$ from the output SAM unit 6 is designated a third operation. These three operations form a pipe line operation performed every horizontal scanning period of a video signal. While the respective operations are executed one by one for input data $D_{IN}$ of a particular horizontal scanning period with a time shift equal to one horizontal scanning period, the three operations can be simultaneously advanced in parallel.

The conventional processor is composed of the input SAM unit, first data memory unit, second data memory unit, and output SAM unit as described above. In consideration of the performance of the processor thus configured, even if the vertical length in FIG. 1 is extended, i.e., the memory sizes of the input SAM unit 2, data memory unit 3, ALU array unit 4, data memory unit 5, and output SAM unit are increased, address spaces of the respective data memories are merely extended to provide larger working memories.

On the other hand, even if the lateral length in FIG. 1 is extended, i.e., the number of parallel processor elements is increased, an increased number of parallel processor elements does not contribute to the performance of the processor since the parallel processor elements are used in correspondence to the number of pixels in one horizontal scanning period of a video signal to be applied thereto.

Thus, to improve the performance of the processor thus configured, such methods are considered as faster instruction cycles, parallel configuration of ALUs, or parallel configuration of the whole processor, however, these methods have problems in hardware.

Also, since the parallel processor elements in the processor having the above described architecture are used in correspondence to the number of pixels in one horizontal scanning period of a video signal to be applied thereto, the processor has a problem in view of versatility in that the number of the parallel processor elements cannot be corresponded to any number of pixels in one horizontal scanning period. Specifically, if the number of parallel processor elements is matched with the number of pixels in one horizontal scanning period of a particular image format, the parallel processor elements may be excessive or lacking for different image formats. Thus, the parallel processor elements cannot always be utilized satisfactorily.

SUMMARY OF THE INVENTION

In view of the foregoing, an object of this invention is to provide a signal processing apparatus which has a high performance as well as a highly versatile and simple configuration.

The foregoing objects and other objects of the invention have been achieved by the provision of a signal processing apparatus according to a first embodiment of the invention is structured in that a plurality of processor blocks, each of which is a multiple parallel digital signal processor having bit processing processor elements arranged in one-dimensional array, are connected in sequence, and in which a processor block at a subsequent stage is selectively supplied either with an output of a processor block at a previous stage or input data, and one of outputs of the processor blocks is outputted as a final output.

In a signal processing apparatus according to a second embodiment of the invention, a plurality of processor blocks, each of which is a multiple parallel digital signal processor having bit processing processor elements arranged in one-dimensional array, are connected in sequence, and in which the processor block at the first stage is formed of a serial-to-parallel converting unit for converting input data from a serial form to a parallel form, a first storage unit for storing data, and a first processing means for processing data, the processor block at the last stage is formed of a second storage unit for storing data, a second processing unit for processing data, and a parallel-to-serial converting unit for converting data from a parallel form to a serial form and for outputting converted data. And each of the other processor blocks is formed of a third storage unit for storing data and a third processing unit for processing data.

Further, a signal processing apparatus according to a third embodiment of the invention is structured in that a processor block column is formed of a plurality of the processor blocks structured as in the second embodiment of the invention, each including the signal processing apparatus of the second embodiment of the invention, are connected in a manner similar to the processor block of the first embodiment of the invention to from a signal processing apparatus.

In the first embodiment of the invention, the switching operations of the first and second selectors can be controlled to freely select the number of processor blocks for accepting input data. Therefore, the first embodiment of the invention can support signals in a variety of formats having different numbers of data in one unit (for example, the number of pixel data in one horizontal scanning period if input data is, for example, image data) without causing redundant or lacking bit processing elements.

In the second embodiment of the invention, a plurality of processor blocks are connected in sequence to build a signal processing apparatus having higher performance. Also, in this case, since the processor block at the first stage, the processor block at the last stage, and the other processor blocks are formed as mentioned above, components in the respective processor blocks, which are not required for connecting the plurality of processor blocks in sequence (for example, parallel-to-serial converting means at the first stage as an output unit, serial-to-parallel converting means at the last stage as an input unit, and so on) can be removed to simplify the configuration of the signal processing apparatus.

Further, in the third embodiment of the invention, a plurality of processor block columns each comprising a plurality of processor blocks arranged in the manner of the second embodiment of the invention are provided and connected in the manner of the first embodiment of the invention, thereby making it possible to freely select the number of processor block columns for accepting input data as well as to remove components in the respective processor blocks which are not required for connecting the plurality of processor blocks in sequence. Thus, signals in a variety of formats having different numbers of data in one unit (for example, the number of pixel data in one horizontal scanning period if input data is, for example, image data) can be supported without causing redundant or lacking bit processing elements. In addition, the performance can be improved while simplifying the configuration.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A to 5E are timing charts used for explaining the operation of the video signal processor illustrated in FIG. 4;

FIGS. 6A to 6C are timing charts used for explaining another mode of operation of the video signal processor of FIG. 4;

FIGS. 7A to 7C are timing charts used for explaining still another embodiment;

DETAILED DESCRIPTION OF THE EMBODIMENT

Preferred embodiments of this invention will be described with reference to the accompanying drawings:

(1) First Embodiment
(1-1) Lateral Extension of Processor Block

Conventionally, a variety of formats have been used for images. When excluding a blanking period, the number of effective pixels in the horizontal direction of a screen (i.e., the horizontal scanning period) is on the order of 700 to 1,000 in the common TV signal standard, 1,920 in the broadcasting station standard for high definition TV signals, and in a range of 1,000 to 1,500 in the consumer standard for high definition TV (HDTV) signals.

Therefore, in a multiple parallel DSP processor having a large number of processor elements for bit processing arranged in a one-dimensional array, if the DSP processor is configured to support any of the above-mentioned standards, approximately 2,000 processor elements must be arranged in parallel. A processor having as much as 2,000 parallel processor elements would be excessively large, and more than half of the processor elements would be redundant when used for processing a standard TV signal.

The first embodiment, in view of this problem, treats "a linear-arrayed parallel processor by SIMD control" as "a block" in the lateral direction, and arranges two such blocks in parallel so as to flexibly support a variety of image formats.

(1-2) Configuration of Video Signal Processor According to First Embodiment

Figure 4:
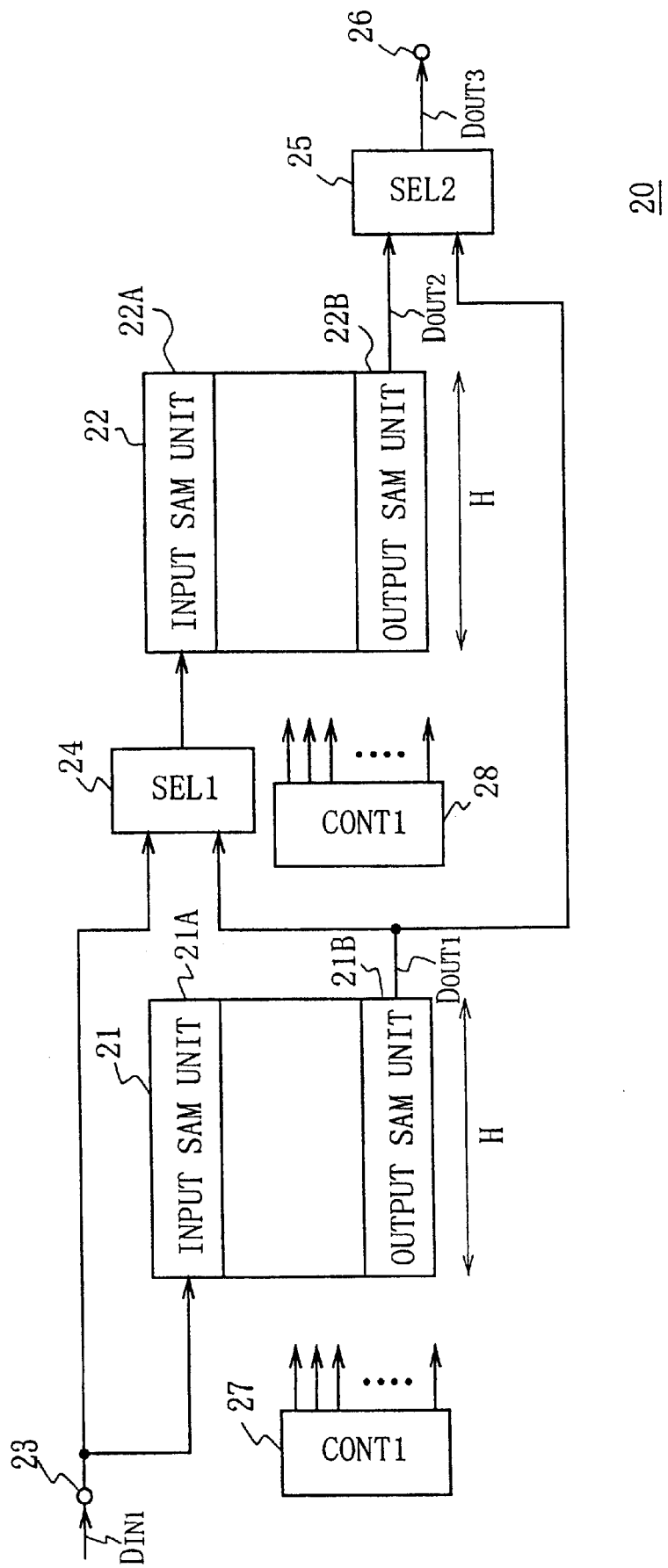
FIG. 4 is a block diagram illustrating the whole configuration of a video signal processor according to a first embodiment of the invention.

FIG. 4 generally shows a video signal processor 20 according to the first embodiment. For example, this video signal processor is composed of first and second blocks 21, 22 laterally arranged in parallel. Each of the blocks is configured similarly to the linear array type processor 1 illustrated in FIG. 1 except that the program control unit 7 is removed.

More specifically, in the video signal processor 20, a signal input terminal 23 is connected to an input terminal of the first block 21 and to a first switching terminal of a first selector 24. While an output terminal of the first block 21 is connected to a second switching terminal of the first selector 24 and a second switching terminal of a second selector 25.

Also, an output terminal of the first selector 24 is connected to an input terminal of the second block 22, an output terminal of the second block 22 is connected to a first switching terminal of the second selector 25, and an output terminal of the second selector 25 is connected to a signal output terminal 26.

In this case, the first block 21 is configured such that a video signal $D_{IN1}$, comprising bit-parallel and time-series serial video data in units of horizontal scanning period of an image supplied through the signal input terminal 23, is subjected to predetermined processing under the control of a first program control unit 27, and the processed result is outputted through an output SAM unit 21B (i.e., sent to the second switching terminals of the first and second selectors 24, 25).

Similarly, the second block 22 is configured such that the video signal $D_{IN1}$ supplied thereto through the first selector 24 directly or as an output signal $D_{OUT1}$ of the first block 21 is subjected to predetermined processing under the control of a second program control unit 28, and the processed result is outputted through an output SAM unit 22B (i.e., sent to the first switching terminal of the second selector 25).

Also, in each of the first and second blocks 21, 22, the number H of bit processing processor elements placed in a one-dimensional array is selected to match an upper limit of the number of pixels in one horizontal scanning period of the standard TV signal (approximately 1,000 pixels). This number is equal to the value of the maximum number of the bits (OSB) in the prior art example illustrated in FIG. 1.

Actually, in this video signal processor 20, when a standard TV signal is supplied thereto as the video signal $D_{IN1}$, the first selector 24 selects the second switching terminal, and the second selector 25 selects the first switching terminal.

Thus, the video signal processor 20 can sequentially perform predetermined processing on the video signal $D_{IN1}$ composed of a standard TV signal supplied through the signal input terminal 23 in the first and second blocks 21, 22, respectively, making it possible to double the processing performed on the standard TV signal as compared with the prior art.

FIGS. 5A–5E illustrate the operation timing in the above described processing. Specifically, FIG. 5A illustrates the input timing of each line data in the video signal $D_{IN1}$; FIG. 5B illustrates the processing timing of each line data in the first block 21; FIG. 5C illustrates the transfer timing of each line data from the first block 21 to the second block 22; FIG. 5D illustrates the processing timing of each line data in the second block; and FIG. 5E illustrates the output timing of each line data from the second selector 25.

On the other hand, when an HDTV signal is inputted as the video signal $D_{IN1}$, the first block 21 selectively receives the former half of pixel data in one horizontal scanning period of the video signal $D_{IN1}$, equally divided into two, through the input SAM unit 21A. Simultaneously, the first selector 24 selectively delivers the latter half of the pixel data in one horizontal scanning period of the video signal $D_{IN1}$ supplied to the first switching terminal thereof to the input SAM unit 22A of the second block 22.

In this event, the respective input SAM units 21A, 22A and the respective output SAM units 21B, 21B of the first and second blocks 21, 22 stop operating during the latter half or the former half of one horizontal scanning period, respectively.

The second selector 25, in turn, selects the second switching terminal at the timing the output $D_{OUT1}$ of the first block 21 is supplied thereto, and selects the first switching terminal at the timing the output $D_{OUT2}$ of the second block 22 is supplied thereto.

In this way, the video signal processor 20 processes the former half portion of the video signal $D_{IN1}$ composed of an HDTV signal of one horizontal scanning period in the first block 21 and the latter half portion of the video signal $D_{IN1}$ in the second block 22, thus making it possible to perform predetermined processing on the HDTV signal having the number of pixels in one horizontal scanning period larger than the number H of bit processing processor elements in each of the first and second blocks 21, 22 (in the first embodiment, the number H is 1,000).

It should be noted that while no problems arise as long as the number of input terminals (the number of input bits ISB (FIG. 1)) and the number of output terminals (the number of output bits OSB (FIG. 1)) are the same in the first and second blocks 21, 22, the difference between these numbers would cause awkward operations. Specifically, if the two input lines have different numbers of terminals in the first and second selectors 24, 25, it is difficult to understand how these first and second selectors 24, 25 make selections. To avoid this inconvenience, it is assumed in this embodiment that if the number OSB of output terminals is larger than the number ISB of input terminals in the first and second blocks 21, 22, a fraction of output terminals equal to the number ISB of input terminals are accepted by the first and second selectors 24, 25 as their inputs. It is also assumed that if the number ISB of input terminals is larger than the number OSB of output terminals, wires from the first block 21 are connected to only a portion of the input terminals of the first selector 24.

(1-3) Operation of First Embodiment

In the foregoing configuration, when the video signal processor 20 is supplied with a standard TV signal as the video signal $D_{IN1}$, the first selector 24 selects the second switching terminal, and the second selector 25 selects the first switching terminal, whereby the first and second blocks 21, 22 perform respective predetermined processing on the video signal $D_{IN1}$. Then, the video signal processor 20 sends the output $D_{OUT2}$ of the second block 22 thus produced as an output signal $D_{OUT3}$ to the outside through the signal output terminal 26.

On the other hand, if an HDTV signal is supplied as the video signal $D_{IN1}$, the first block 21 processes the former half of the video signal $D_{IN1}$ in one horizontal scanning period, while the second block 22 processes the latter half of the same. Subsequently, the former half and the latter half of the video signal $D_{IN1}$ are returned to the original time serial arrangement to produce the output signal $D_{OUT3}$ which is sent to the outside through the signal output terminal 26.

In this event, the video signal processor 20 can select one of the blocks 21, 22 for accepting the video signal $D_{IN1}$ by switching the first selector 24, as described above. Also, since the number H of bit processing processor elements arranged in one-dimensional array in each of the first and second blocks 21, 22 is equal to the upper limit of the number of pixels in one horizontal scanning period of the standard TV signal, even if the standard TV signal, for example, is supplied as the video signal $D_{IN1}$, no bit processing processor elements in the first and second blocks 1, 2 are redundant. On the other hand, even if an HDTV signal is supplied as the video signal $D_{IN1}$, the number of bit processing processor elements in the first and second blocks 21, 22 will not be short.

The video signal processor 20, configured as described above, can practically sufficiently support any video signal $D_{IN1}$ even if either a standard TV signal or an HDTV signal is supplied thereto as the video signal $D_{IN1}$.

For reference, since the HDTV signal has a different sampling frequency from that of the standard TV signal, the input/output data rates are also different when the HDTV signal is supplied as the video signal $D_{IN1}$ and when the standard TV signal is supplied as the video signal $D_{IN1}$. This results in differences in the data input speed to the input SAM units 21A, 22A in the first and second blocks 21, 22 and in the data output speed from the output SAM units 21B, 22B in the first and second blocks 21, 22. Additionally, since the horizontal scanning period of the HDTV signal is different from that of the standard TV signal, the number of programmable instruction steps is different.

Specifically, assuming that one horizontal scanning period is T, and an instruction cycle time of the processor is t, a limit L of the number of programmable instruction steps is given by the following equation:

$$L = T/t \tag{1}$$

It should be therefore noted that when an HDTV signal is supplied as the video signal $D_{IN1}$, the number of programmable instruction steps is reduced as compared with the case where a standard TV signal is supplied.

(1-4) Effects of First Embodiment

According to the video signal processor configured as described above, the present invention is structured that where a large number of one-dimensionally arranged parallel DSP processors are formed into a block, the first block 21 is supplied with the video signal $D_{IN1}$ while the second block 22 is selectively supplied with the output of the first block 21 or with the video signal $D_{IN1}$ supplied to the signal input terminal 23 by the first selector 24, and either of the outputs $D_{OUT1}$ and $D_{OUT2}$ of the first and second blocks 21, 22 is selectively delivered as a final output by the second selector 25, thereby, the video signal processor of the present invention can universally support any video signal $D_{IN1}$ which may be a standard TV signal or an HDTV signal, without leaving any processor elements inoperative. It is therefore possible to realize a video signal processor which is capable of universally supporting a variety of image formats.

(1-5) Other Embodiments

While the foregoing first embodiment has been described for the case where the present invention is applied to a video signal processor, the present invention is not limited to the video signal processor but may be applied to a variety of signal processing apparatuses.

Also, in the first embodiment, only two processor blocks (first and second blocks 21, 22), each comprising a large number of parallel DSP processors arranged in one-dimensional array, are connected to constitute the video signal processor. The present invention, however, is not limited to this particular configuration, and the number of processor blocks may be three or more, provided that a signal processing apparatus (including a video signal processor) is configured with sequentially connected processor blocks such that a subsequent processor block is selectively supplied either with the output of the previous processor block or with input data by a first selector associated therewith, and any of the outputs from the processor blocks is selectively delivered as a final output of the signal processing apparatus by a second selector.

Figure 1:
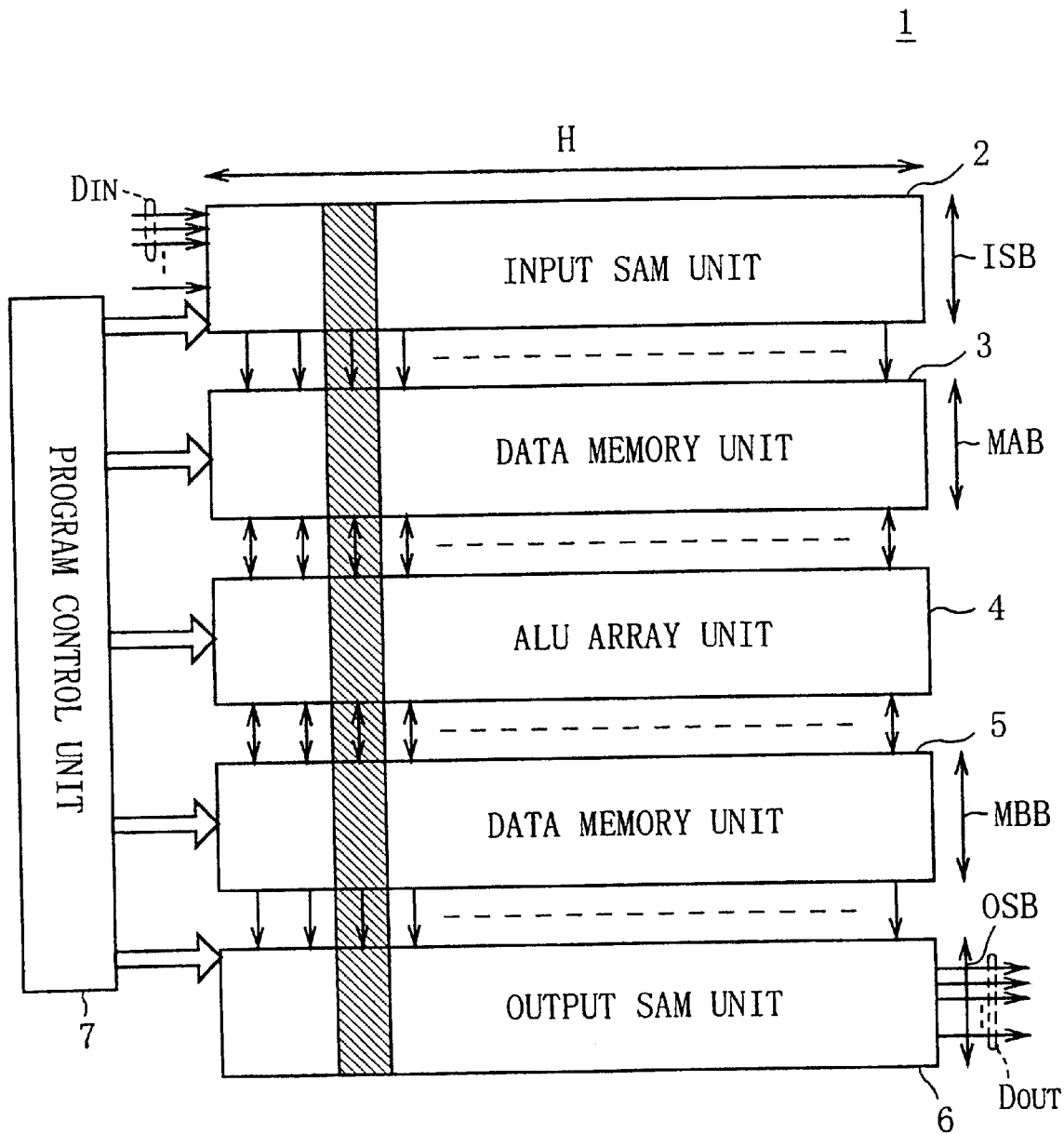
FIG. 1 is a block diagram illustrating the configuration of a conventional linear array type processor.

Further, in the first embodiment, each of the first and second blocks 21, 22 has been described to have the configuration, for example, identical to the linear array type processor 1 illustrated in FIG. 1 except that the program control unit 7 is removed. However, the present invention is not limited to this configuration. Alternatively, a variety of other configurations may be applied to the first and second blocks 21, 22, provided that the configuration comprises a multiple parallel DSP processor formed of bit processing processor elements arranged in one-dimensional array.

In this case, if the present invention is applied, for example, to build a video signal processor, each of the first and second blocks 21, 22 may be composed of a serial-to-parallel converting unit for converting bit-parallel and time-series serial pixel data supplied thereto into bit-serial and time-series parallel image data in units of horizontal scanning period of the image; a processing unit for processing the bit-serial and time-series parallel image data converted by the serial-to-parallel converting unit in units of horizontal scanning period; and a parallel-to-serial converting unit for converting the bit-serial and time-series parallel image data into bit-parallel and time-series serial image data in units of horizontal scanning period of the image and for outputting the converted image data.

Further, in the first embodiment, when a standard TV signal is supplied as the image signal $D_{IN1}$, the first and second selectors 24, 25 are both operated to select the first switching terminal. The present invention, however, is not limited to this selecting operation, and the selectors 24, 25 may be operated in a different way.

For example, the first selector 24 may be programmed to select the first switching terminal so that the video signal $D_{IN1}$ is supplied to both of the first and second blocks 21, 22 to perform different processing on the video signal $D_{IN1}$ in the respective first and second blocks 21, 22, and a required one of the outputs $D_{OUT1}$, $D_{OUT2}$ may be selected by the second selector 25 as the output signal $D_{OUT3}$. FIGS. 6A–6C illustrate timing charts associated with this operation. Specifically, the timing chart of FIG. 6A illustrates the input timing of each line data in the video signal $D_{IN1}$; the timing chart of FIG. 6B illustrates the processing timing of each line data in the first and second blocks 21, 22; and the timing chart of FIG. 6C illustrates the output timing of each processed data from the first and second selectors 24, 25.

In this event, the selection made by the second selector 25 may be made in units of horizontal scanning period or in units of pixel. Further alternatively, the second selector 25 may be operated based on the result of any calculation. Furthermore, external control signals or conditioning signals may be used to change the contents of the processing performed on the video signal $D_{IN1}$ by the respective first and second blocks 21, 22.

As another operating method of the blocks 21, 22 when a standard TV signal is supplied as the video signal $D_{IN1}$, the first selector 24 is programmed to select the first input terminal, the standard TV signal is applied as the video signal $D_{IN1}$ on two lines at a speed twice higher than the normal speed of the standard TV signal, and the standard TV signal on one line is first led to the second block 22 in the former half of the original horizontal scanning period, while the standard TV signal on the other line is led to the first block 21 in the latter half of the horizontal scanning period. In the first and second blocks 21, 22, different predetermined processing is performed on the supplied signals. Then, the output $D_{OUT2}$ of the second block 22 and the output $D_{OUT1}$ of the first block 21 are sequentially delivered therefrom at double the speed, such that the outputs $D_{OUT1}$, $D_{OUT2}$ are selectively passed through the second selector 25 timely in the former half and the latter half of the original horizontal scanning period, respectively. In this way, it is possible to provide both the processing results of the video signal $D_{IN1}$ on the two lines. FIGS. 7A–7C illustrate timing charts associated with this operation. Specifically, the timing chart of FIG. 7A illustrates the input timing of each line data in the video signal $D_{IN1}$; the timing chart of FIG. 7B illustrates the processing timing of each line data in the first and second blocks 21, 22; and the timing chart of FIG. 7C illustrates the output timing of each line data from the first and second selectors 24, 25, respectively.

While the input/output operation of a standard TV signal at double the speed using two lines of data processing may be carried out in units of horizontal scanning period as described above, the same operation may be carried out in units of pixel. The unit of the operation is not limited to any particular one as long as the respective input SAM units 21A, 22A and output SAM units 21B, 22B in the first and second blocks 21, 22 and the first and second selectors 24, 25 are programmed to perform corresponding operations. In this event, while the respective input SAM units 21A, 22A and output SAM units 21B, 22B in the first and second blocks 21, 22 must operate at double the speed, since these components are assumed to be capable of processing HDTV signals, they can of course process standard TV signals at double the speed.

The processing performed in the first and second blocks 21, 22 in this event may be identical or different.

Further, while in the first embodiment, one horizontal scanning period is divided into the former half and the latter half when an HDTV signal is inputted as the video signal $D_{IN1}$ as a method of dividing pixels during one horizontal scanning period, the present invention is not limited to this particular method. Alternatively, many variations may be applied to the method of dividing pixels in one horizontal scanning period. For example, the pixels may be alternately distributed one by one to two groups.

It should be noted that, when pixels in one horizontal scanning period are bisected such that two portions are processed by separate processor blocks, including the first embodiment, the bisection of input data at a pixel corresponding to the center of a horizontal scanning period may cause inconveniences in some processing, particularly, in filtering. This may occur where operational processing on each pixel requires data on left and right adjacent pixels, for example, in a horizontal digital filter. In such a case, if a bisection point was clearly defined, pixels around a joint in a recovered image could not be properly calculated. As a solution to this problem, input data may be divided into two groups such that data in the two groups partially overlap with each other.

Further in the first embodiment, while the processing means arranged in each of the first and second blocks 21, 22 is configured as the ALU array unit 4 (composed of a plurality of the ALU array cells 4A in FIG. 3) illustrated in FIG. 1, the present invention is not limited to this configuration, and a variety of other configurations may be applied to the processing means. For example, when the processing unit is composed of a processor unit such as the ALU 4B (FIG. 3) and a pipe line register positioned at least previous to or subsequent to the processor unit, higher speed processing can be achieved.

Figure 3:
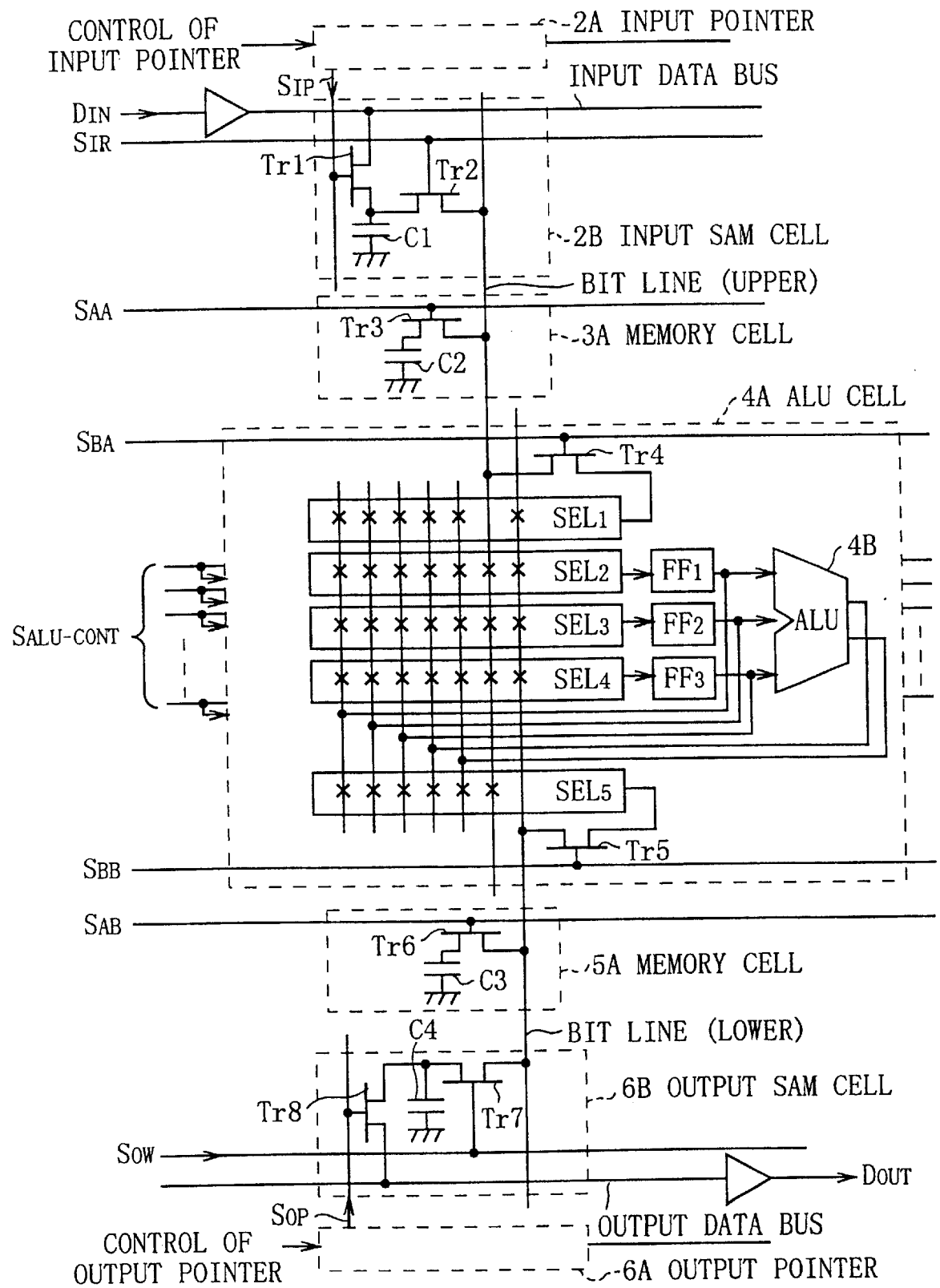
FIG. 3 is a schematic diagram illustrating an example of a conventional processor element.

Further in the first embodiment, while the respective input SAM units 21A, 22A and output SAM units 21B, 22B in the first and second blocks 21, 22 and other storage units (memory) are configured as illustrated in FIG. 3, the present invention is not limited to the illustrated configuration. Alternatively, a three-port memory having two ports for reading and one port for writing may be applied to the input SAM units 21A, 22A and output SAM units 21B, 22B in the first and second blocks 21, 22 and other storage unit (memory). In this case, bit lines for the respective ports may be assigned exclusively to write and read operations.

(2) Second Embodiment (2-1) Extension of Processor Block in Vertical Direction

Next, description will be made on a technique according to a second embodiment for improving the processor performance in a multiple parallel DSP processor which has a large number of bit processing processor elements arranged in one-dimensional array.

As described above, the improvement in performance of the multiple parallel DSP processor having the aforementioned architecture must rely on faster instruction cycles, parallel configuration of ALUs, or parallel configuration of a whole DSP processor. Described in the following is an improvement in processing performance of a DSP processor based on a parallel configuration of a whole DSP processor.

In the first embodiment, since two processor blocks are connected in series to realize a double processing capability, it can be said that the object of improving the processor performance is achieved to some degree. However, the following alternative can be still considered.

In the first embodiment, a multiple parallel DSP processor having a large number of bit processing processor elements arranged in one-dimensional array is treated as one block, and two such blocks (first and second blocks 21, 22) are arranged in the lateral direction. In the second embodiment, these blocks are arranged in the vertical direction to implement a parallel configuration of the multiple parallel DSP processor.

However, this parallel configuration does not simply mean to configure a video signal processor which has the first and second processor blocks 21, 22 arranged in the vertical direction such that an input video signal $D_{IN1}$ is subjected to predetermined processing in sequence in the respective first and second blocks 21, 22. Then the output $D_{OUT2}$ of the second block is delivered as a final output. Actually, this configuration is the same as the serial processing performed on a standard TV signal by the first and second blocks 21, 22 in the video signal processor 20 of the first embodiment.

It is noted however that in a video signal processor 30 configured as described above, an output SAM unit 21B in the first block 21 and an input SAM unit 22A in the second block 22 are redundant.

Specifically, in the video signal processor 20, the output SAM unit 21B in the first block 21 parallelly receives multiple parallel data of one horizontal scanning period portion from a large number of processor elements of a parallel configuration, and merely converts the parallel data into a serial data sequence in order to restore the parallel data to time series data of an image signal in a horizontal scanning period. Also, the input SAM unit 22A in the second block 22 receives the time-series data of the image signal in a horizontal scanning period and merely converts the time-series data into parallel data in order to provide multiple parallel data of a horizontal scanning period portion to the respective processor elements of a parallel configuration.

It will be understood from the above discussion that the output SAM unit 21B in the first block 21 and the input SAM unit 22A in the second block 22 may be omitted, such that multiple parallel data, to be inputted to the output SAM unit 21B in the first block 21, is directly coupled to multiple parallel data at the output of the input SAM unit 22A in the second block 22.

(2-2) Configuration of Video Signal Processor According to Second Embodiment

Figure 8:
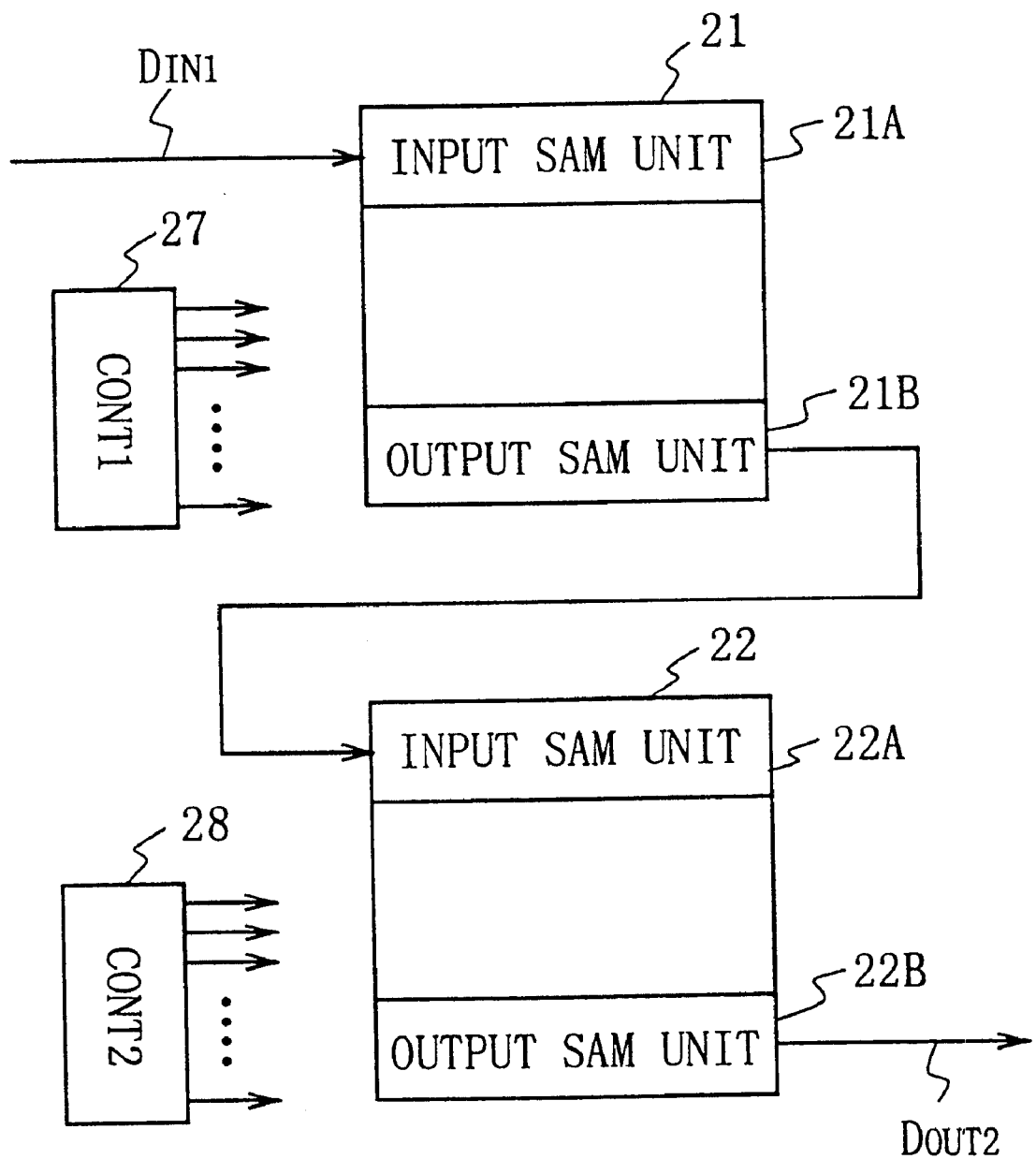
FIG. 8 is a block diagram illustrating an example of a video signal processor having two blocks vertically arranged in parallel.
Figure 9:
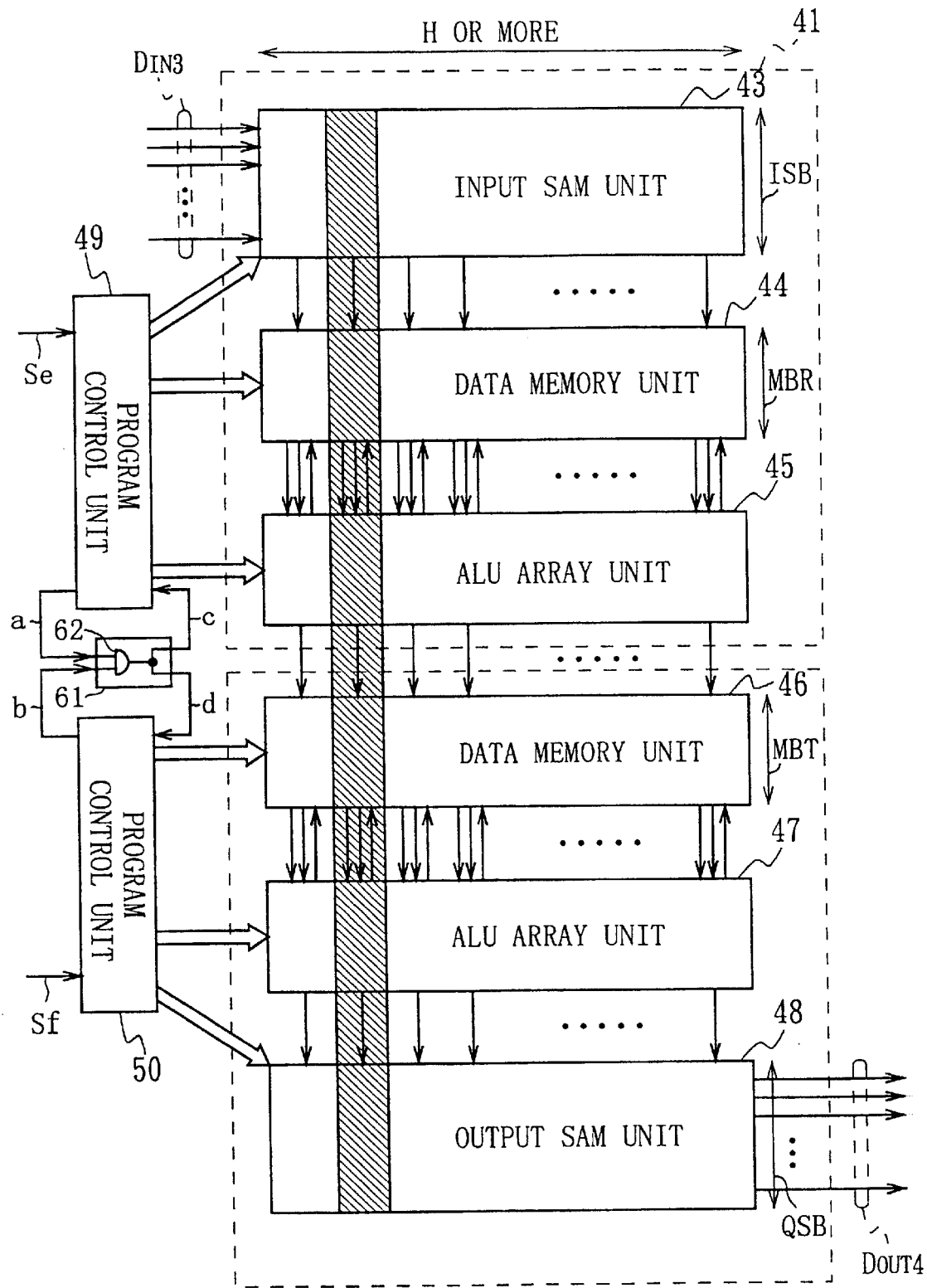
FIG. 9 is a block diagram illustrating the whole configuration of a video signal processor according to a second embodiment of the invention.

FIG. 9 illustrates a video signal processor 40 according to the second embodiment, wherein the output SAM unit 21B in the first block 21 and the input SAM unit 22A in the second block 22 in the video signal processor 30 illustrated in FIG. 8 are removed from the configuration. In addition, in the video signal processor 40, a portion corresponding to the data memory units 3, 5 in FIG. 1 is rearranged into new data memory units 44, 46, which are implemented by a single three-port memory having dedicated bit lines, and a pipe line processing is applied in order to improve the performance.

Thus, while the video signal processor 40 is actually composed of two blocks (first and second blocks 41, 42) each including a multiple parallel DSP processor having a large number of bit processing processor elements arranged in one-dimensional array, it can be said that, regarding the two blocks as a single processor block sequence, the processor block sequence is a new processor block composed of an input SAM unit 43, a data memory unit 44, an ALU array unit 45, a data memory unit 46, an ALU array unit 47, an output SAM unit 48, a program control unit 49, and a program control unit 50, as is apparent also from FIG. 9.

Actually in the video signal processor 40, the first block 41 includes the input SAM unit 43, data memory unit 44, and ALU array unit 45 which constitute a group of a large number of parallel processor elements arranged in a linear array configuration, wherein the large number of processor elements can be SIMD controlled in association with each other by a common program control of the program control unit 49.

The second block 42, in turn, includes the data memory unit 46, ALU array unit 47, and output SAM unit 48 which constitute a group of a large number of parallel processor elements arranged in a linear array configuration, wherein the large number of processor elements can be SIMD controlled in association with each other by a common program control of the program control unit 50.

In the above configuration, since the input SAM unit 43 and the output SAM unit 48 can be regarded as completely the same as the configuration illustrated in FIG. 1, explanation thereof is omitted.

The program control unit 49 and the program control unit 50 are basically configured in substantially the same manner as the configuration shown in FIG. 1, and can communicate with each other through an arbiter circuit 61 comprising, for example, an AND gate circuit as illustrated in FIG. 9.

All of the input SAM unit 43, data memory unit 44, data memory unit 46, and output SAM unit 48 are basically composed of memories, wherein the input SAM unit 43 and the data memory 44 are located in the same address space, and the data memory 46 and the output SAM unit 48 are located in the same address space. The following description will be made on the assumption that the ROW address decoding operation for these memories, though not explained in particular, is regarded as being included in the program control unit 49 and the program control unit 50.

Figure 2:
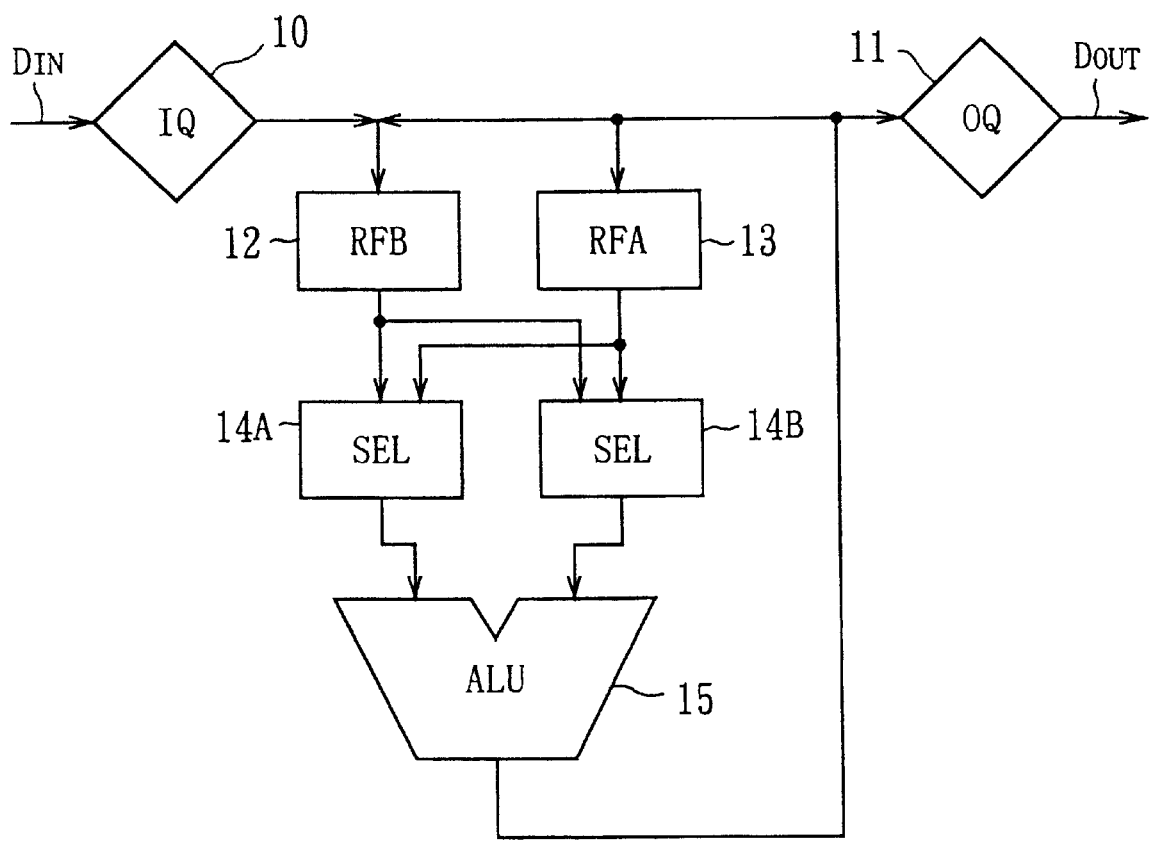
FIG. 2 is a block diagram illustrating FIG. 1 in correspondence to the configuration of a general processor.
Figure 10:
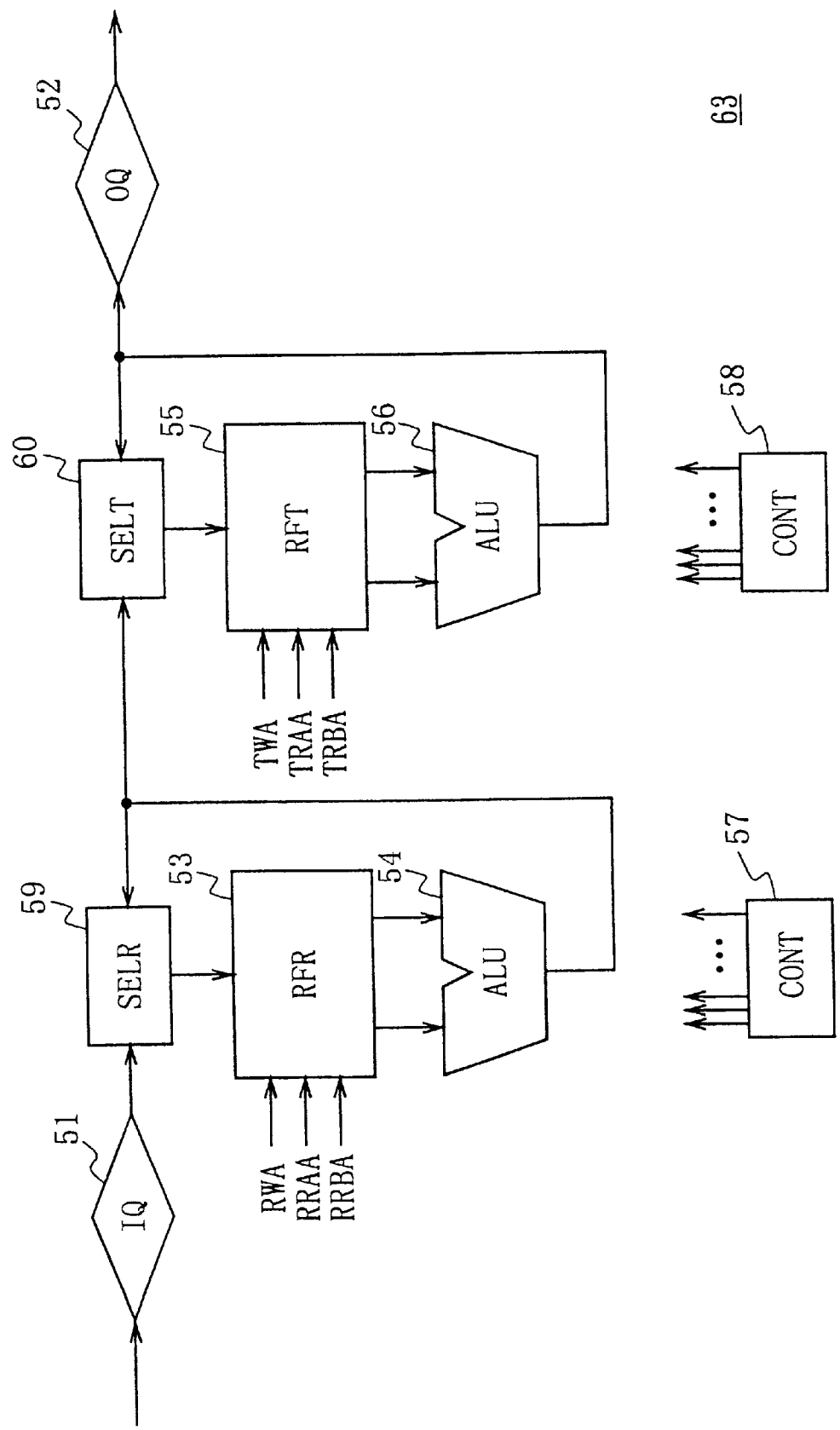
FIG. 10 is a block diagram illustrating FIG. 9 in correspondence to the configuration of a general processor.

When the whole configuration including the first block 41 and the second block 42 in combination is regarded as a new processor block, a single element portion of a large number of parallel processor elements corresponds to a vertically extended area as indicated by hatching in FIG. 9. Similar element portions are linearly arranged in the lateral direction in FIG. 9. Specifically, each processor element is equivalent to the configuration as illustrated in FIG. 10, when expressed in conformity to the configuration of the general processor illustrated in FIG. 2. It should be noted that the processor element also comprises a bit processing processor as the structural example of FIG. 1.

Referring specifically to FIG. 10, in a processor 63, an input buffer memory (IQ) 51 corresponds to the input SAM unit 43 in FIG. 9; an output buffer memory (OQ) 52 corresponds to the output SAM unit 48; a data memory (RFR) 53 corresponds to the data memory unit 44; an ALU (ALU) 54 corresponds to the ALU array unit 45; a data memory (RFT) 55 corresponds to the data memory unit 46; an ALU (ALU) 56 corresponds to the ALU array unit 47. Also, a controller (CONTR) 57 and a controller (CONTT) 58 in FIG. 10 correspond to the program control units 49, 50, respectively.

In this configuration, as mentioned above, the respective data memories 53, 55 in FIG. 10 (i.e., the data memory unit 45 and the data memory unit 46 in FIG. 9) are implemented by three-port memories unlike the prior art example. Thereby, two reading operations and one writing operation can be simultaneously performed in one cycle.

The addressing to each of the data memories 53, 55 will provide three addresses at the same time. Outputs from two read ports are led, as they are, to the ALU 54 and the ALU 56 in FIG. 10 (i.e., the ALU array unit 45 and the ALU array unit 47 in FIG. 9), respectively.

The output of the ALU 54 (i.e., the ALU array unit 45) is led to write ports of the data memory units (i.e., the data memory unit 44 and the data memory unit 46) via the respective selectors 59 and 60. The output of the ALU 56, in turn, is led to the data memory 55 via the selector 60 and also led to the output buffer memory 52 (i.e., a write port of the data memory unit 46 and the output SAM unit 48) directly.

Selectors (SELR, SELT) 59, 60 in FIG. 10 each perform an input selection function by three-state buffers B1, B2, B3, B4 in FIGS. 11, 12, later described, for selecting an input source for the write port of the respective three-port memories.

In the second embodiment, the read modify write operation is not performed in memories constituting the input buffer memory 51, the data memories 53, 55, and the output buffer memory 52 in FIG. 10 (i.e., the input SAM unit 43, the data memory units 44, 46, and the output SAM unit 48) as is performed in the structural example of FIG. 1. These memories have dedicated bit lines for write and read operations and perform a single write or read operation in each instruction cycle through these dedicated bit lines.

Also, since the data memories 53, 55 (i.e., the data memory unit 44 and the data memory unit 46) comprise three-port memories as mentioned above and have dedicated bit lines for respective ports. Therefore, some processing operations through the ALUs 54, 56 in FIG. 10 (i.e., the ALU array units 45, 47 in FIG. 9) may present partial time shift in processing cycle due to the pipe line processing in the instruction cycle unit, later described. However, the processing operations can be carried out once per cycle. In other words, no useless cycle occurs due to load and store of data from a memory to the ALU before and after an operation.

The number of parallel processor elements in the linear arrangement in each of the first and second blocks 41, 42 is selected to be the same or larger than the number (H) of pixels in one horizontal scanning period of a video signal to be processed, as is the case of the structural example of FIG. 1.

(2-3) Detailed Configuration of Processor Element

Figure 11:
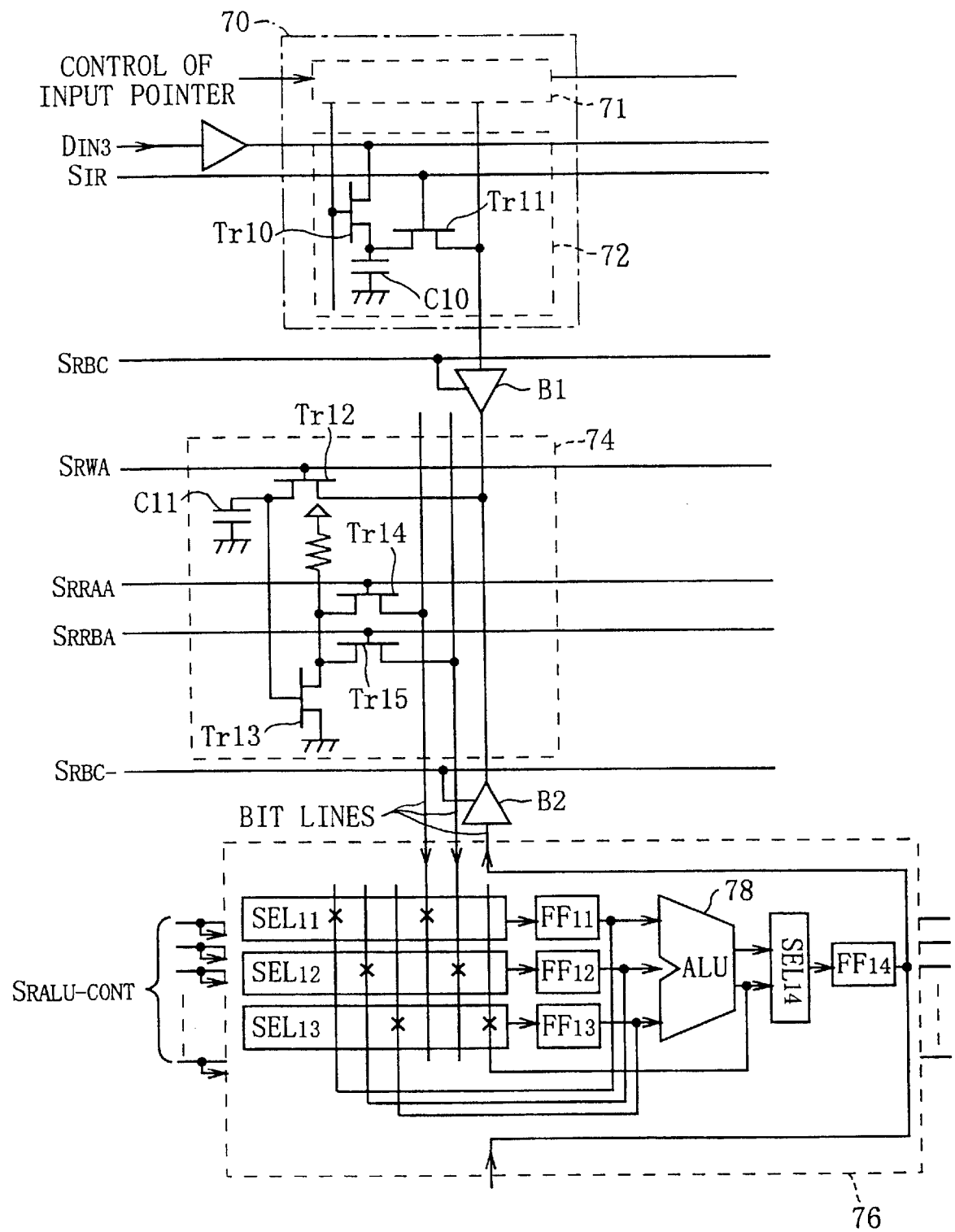
FIG. 11 is a schematic diagram illustrating the configuration of a processor element in the video signal processor shown in FIG. 9.
Figure 12:
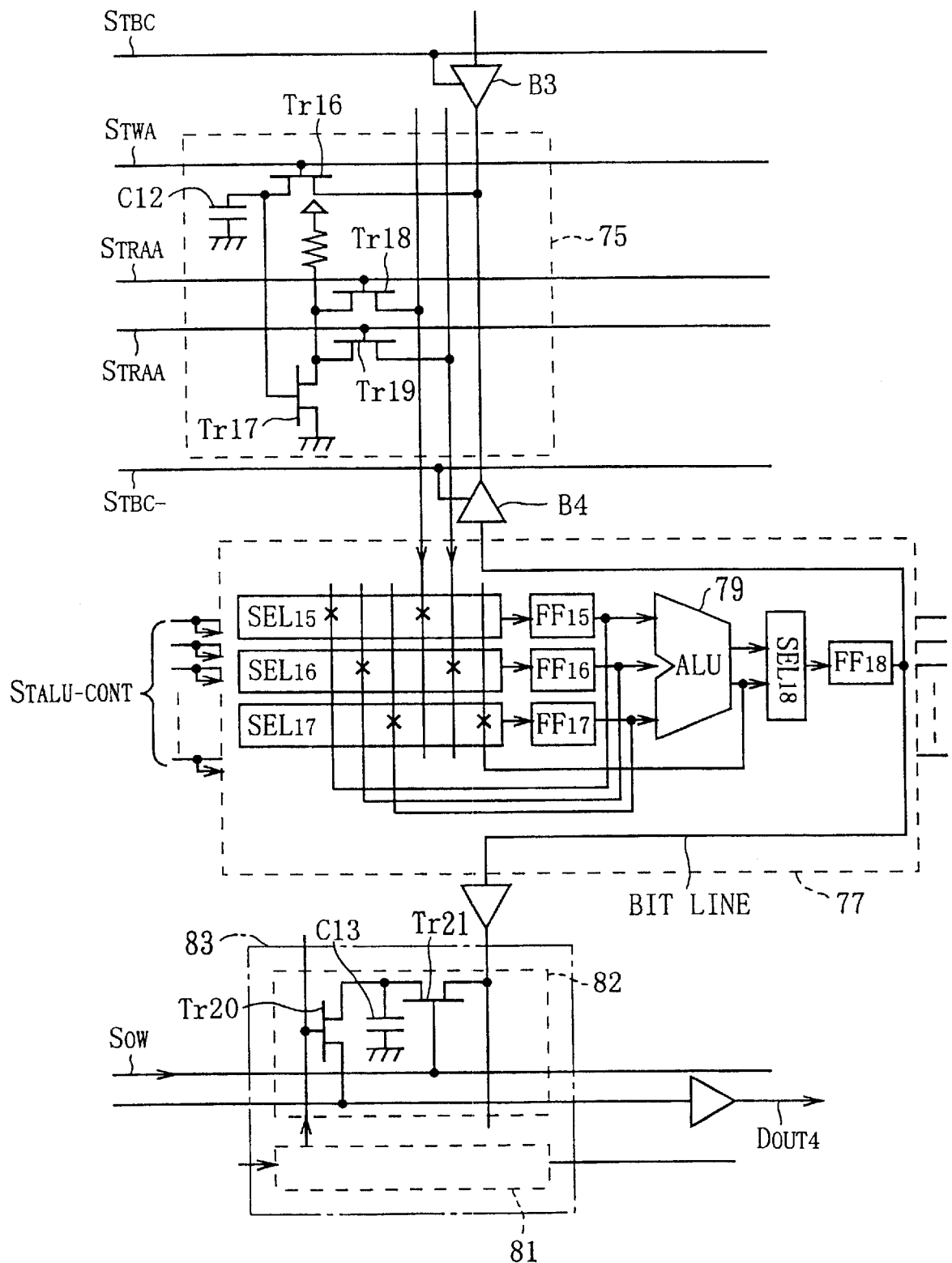
FIG. 12 is a schematic diagram illustrating the configuration of a processor element in the video signal processor shown in FIG. 9.

FIGS. 11, 12 illustrate in detail the configuration of a single processor element portion (indicated by hatching) in the new processor block illustrated in FIG. 9.

Figure 13:
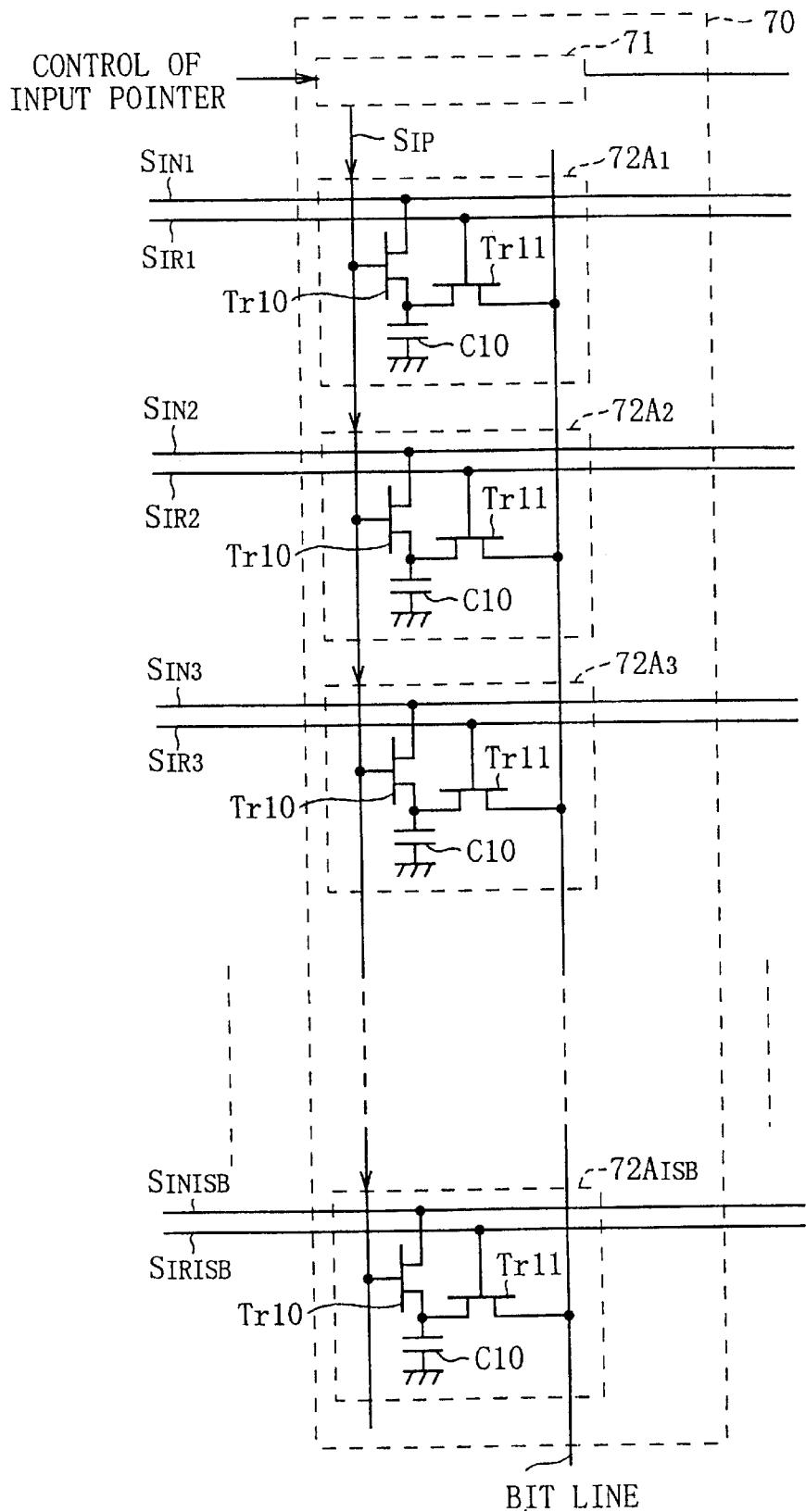
FIG. 13 is a circuit diagram illustrating the configuration of an input SAM unit in detail.

FIG. 13 illustrates the configuration of a single processor element portion in the input SAM unit 43. As is apparent also from FIG. 13, one processor element portion in the input SAM unit 43 comprises an input pointer 71 and a plurality of vertically arranged input SAM cells 72 ($72A_1$, $72A_2$, ..., $72A_{ISB}$) which receive a control from the input pointer 71. Actually, a number of input SAM sells 72 equal to the number of bits (ISB) of an input video signal $D_{IN3}$ in FIGS. 6A–6C are arranged in vertical direction. In FIG. 11, however, such a large number of cells are omitted, and instead, one cell portion only is illustrated for representing them.

Figure 14:
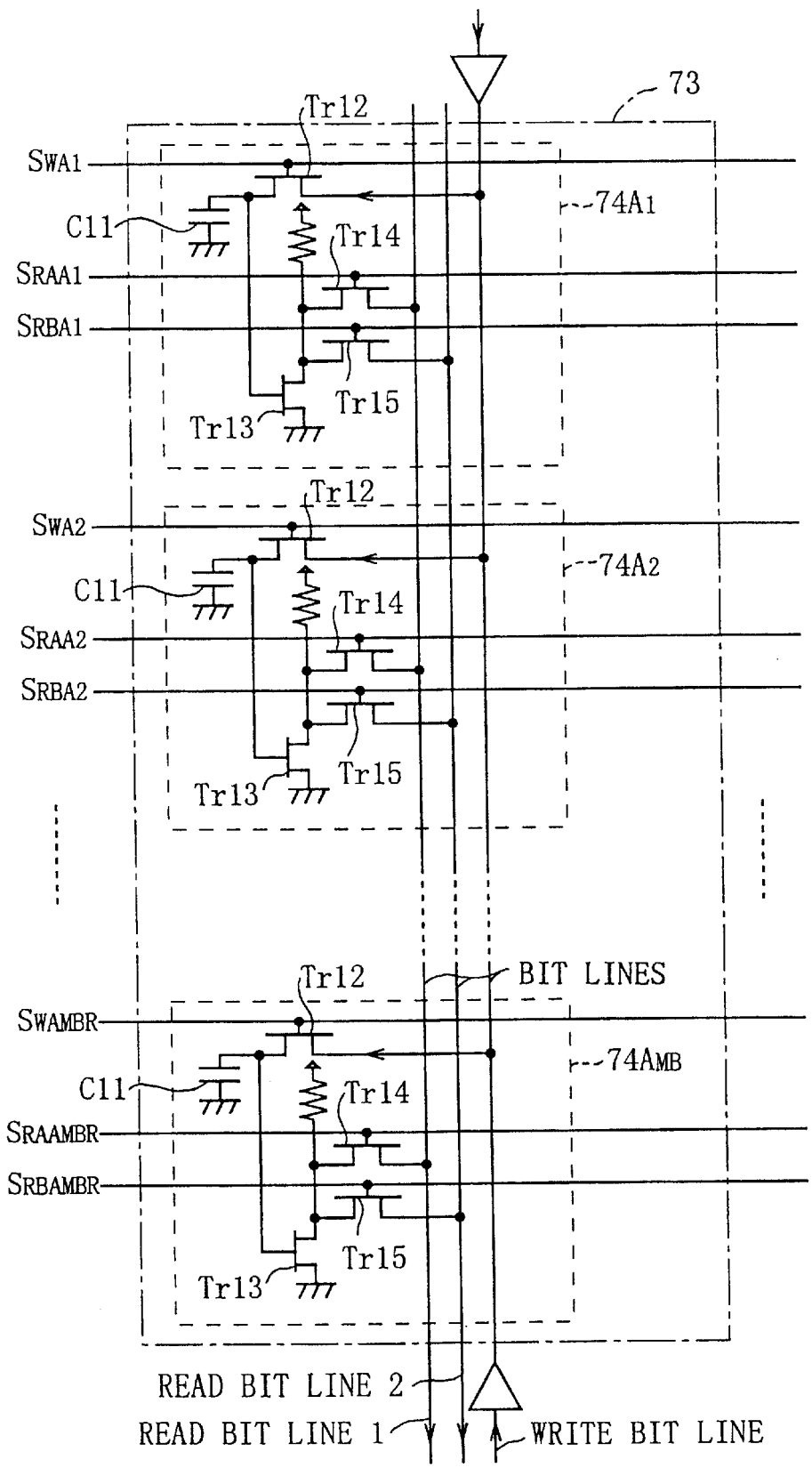
FIG. 14 is a circuit diagram illustrating the configuration of a data memory unit in detail.

FIG. 14 illustrates the configuration of a single processor element portion in the data memory unit 44. As is apparent also from FIG. 14, one processor element portion in the data memory unit 44 comprises a number of vertically arranged three-port memory cells 74 ($74A_1$, $74A_2$, ..., $74A_{MBR}$) equal to the number of bits MBR in FIG. 11. In FIG. 13, however, such a large number of cells are omitted, and instead, one cell only is illustrated for representing them. The number MBR of memory cells are provided as work memories required for operational processing in the first block 41.

A single processor element portion of the data memory unit 46 is the same as that illustrated in FIG. 14. Specifically, a number of three-port memory cells 75 (FIG. 12) equal to the number of bits MBT in FIG. 9 are arranged in the vertical direction. In FIG. 12, however, such a large number of cells are omitted, and instead, one cell only is illustrated for representing them. The number MBT of memory cells are provided as work memories required for operational processing in a block T.

One processor element portion of each of the ALU array unit 45 and the ALU array unit 47 corresponds to the ALU cells 76, 77, respectively, which have the same configuration.

Net ALU portions in the ALU cells 76, 77 are one-bit ALUs 78, 79, each of which only requires a circuit scale of a full adder. The ALU cells 76, 77 also include selectors SEL11–SEL14, SEL15–SEL18 for selecting inputs to the ALUs 78, 79, respectively. The selectors SEL11–SEL13, SEL15–SEL17 select data from one of connection lines which intersect therewith at cross points indicated by a plurality of "×" in FIGS. 11 and 12. FF11–FF14 and FF15–FF18 designate flip-flops (one-bit registers).

Figure 15:
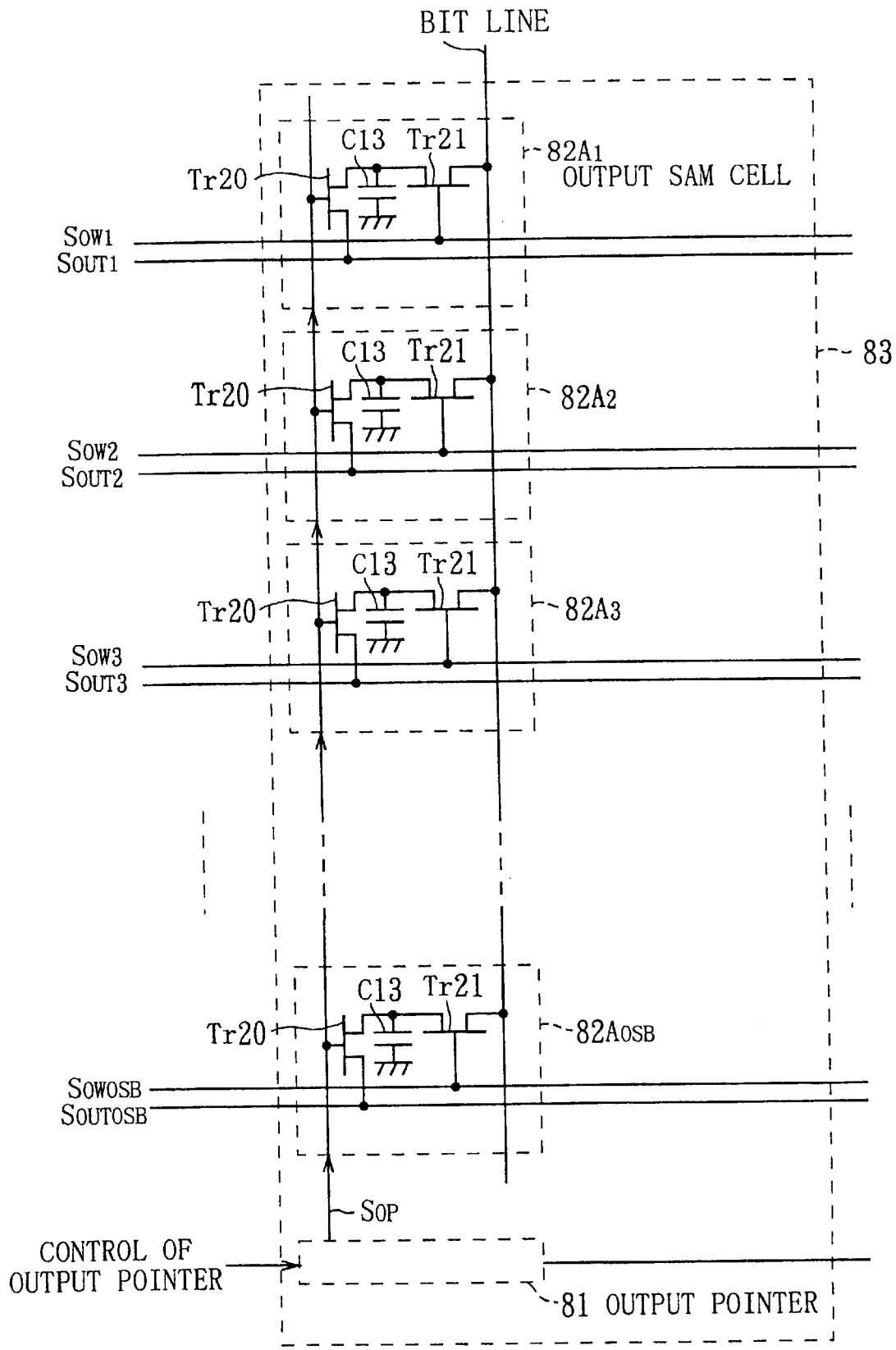
FIG. 15 is a circuit diagram illustrating the configuration of an output SAM unit in detail.

FIG. 15 illustrates a single processor element portion in the output SAM unit 48 (FIG. 9).

The output SAM unit 48 comprises an output pointer 81 and a plurality of vertically arranged output SAM cells 82 ($82A_1, 82A_2, \ldots, 82A_{OSB}$) which receive a control from the output pointer 81. A number of output SAM sells 82 equal to the number of bits (OSB) of an output signal $D_{OUT4}$ in FIG. 9 are provided and arranged in the vertical direction. In FIG. 12, however, such a large number of cells are omitted, and instead, one cell only is illustrated for representing them.

An input SAM read signal $S_{IR}$, memory access signals $S_{RWA}$, $S_{RRAA}$, $S_{RRBA}$, $S_{TWA}$, $S_{TRAA}$, $S_{TRBA}$, and output SAM write signal $S_{OW}$, illustrated in FIGS. 11, 12, are conducted on word lines of the memory cells, where the word lines pass through respective cells in the lateral direction and connect identical circuit components arranged in the lateral direction in a similar manner. It is assumed that the addresses have been decoded for these word lines of memory cells.

It is also assumed that connection lines which vertically pass through the respective cells 72, 74, 75, 76, 77, 82, i.e., bit lines and pointer signal lines pass through these cells as they connect circuit components arranged in the vertical direction in a similar manner.

An input data bus passes through identical circuit components arranged in the lateral direction, i.e., the input SAM cells 72 of the respective processor elements in a similar manner as they connect them. An output data bus also passes through identical circuit components arranged in the lateral direction, i.e., the output SAM cells in a similar manner as they connect them.

Each of all wires illustrated in FIGS. 11, 12 consists of a single line. The "bus" refers to a bus composed of the wires, and means one of the wires composing the bus.

(2-4) Operation of Second Embodiment

Next, the operation of the video signal processor 40 according to the second embodiment will be described with reference to FIGS. 9, 11, 12.

An input video signal $D_{IN3}$ is led to the input SAM unit 43 through the input data bus. A write operation control performed on an input SAM cell 72 by the input pointer 71 is the same as that of the structural example of FIG. 1.

Since the number of laterally arranged processor elements is equal to or larger than the number (H) of pixels in one horizontal scanning period of the video signal $D_{IN3}$, the video signal $D_{IN3}$ is continuously written into the input SAM cells 72 in the right direction during one horizontal scanning period with a clock commensurate with the data rate of the video signal $D_{IN3}$, thereby, one horizontal scanning period portion of the input data is accumulated in the input SAM unit 43. This input operation is repeated every horizontal scanning period.

The operation of the program control unit 49 is similar to the structural example of FIG. 1 only except that the object to be controlled is slightly different. As one horizontal scanning period portion of data on the video signal $D_{IN3}$ is accumulated in the input SAM unit 43, the program control unit 49 executes programmed predetermined processing by SIMD controlling the input SAM unit 43, data memory unit 44, and ALU array unit 45 in the following manner. This program control is repeated every horizontal scanning period. In other words, it is possible to create a program having a number of steps equal to the value calculated by dividing the horizontal scanning period by an instruction cycle period of the video signal processor 40.

Since the SIMD control is performed also in this embodiment, the following operation is simultaneously executed in a similar manner in all the processor elements.

First, one horizontal scanning period portion of the input data accumulated in the input SAM unit 43 (i.e., one horizontal scanning period portion of pixel data) is transferred from the input SAM unit 43 to the data memory unit 44 under the control of the program control unit 49 as required in the next horizontal scanning period, and then subjected to operational processing. The transfer operation of the input data from the input SAM unit 43 to the data memory unit 44 is realized in an instruction cycle in which the contents of required bits stored in the input SAM unit 43 are selected by an input SAM read signal $S_{IR}$ and accessed, and a memory access signal $S_{RWA}$ is outputted to a predetermined three-port memory cell 74 in the destination data memory unit 44 to write the read data bits into the predetermined three-port memory cell 74.

Here, the input SAM read signal $S_{IR}$ and the memory access signal $S_{RWA}$ are conducted on word lines. There are a plurality of these word lines, each of which has been decoded by an address decoder. The data transfer instruction cycle will be next described in greater detail. In an input SAM cell 74 selected by the input SAM read signal $S_{IR}$, a transistor Tr11 turns ON to cause a data signal to be transferred corresponding to a potential on a capacitor C10 to appear on a vertical bit line which is connected to the data memory unit 44. On the other hand, in a three-port memory cell 74 selected by the memory access signal $S_{RWA}$, a transistor Tr12 turns ON to charge a capacitor C11 to a potential corresponding to transferred data. In this event, a bit line control signal $S_{RBC}$ and its inverted signal $S_{RBC-}$ select the input SAM unit 43 as an input source for a write bit line of the data memory unit 44.

The data transfer is performed on a bit-per-cycle basis through a vertical bit line. Since the data does not pass through the ALU 78 during the transfer, unlike the structural example of FIG. 3, no read modify write operation is performed.

Next, the processing operation will be described. In this embodiment, during data processing, data required for the processing is always stored in the data memory unit 44 which is composed of three-port memories having two read ports. Therefore, it is not necessary to transfer data between data memory units as a preparatory operation, as is the case of the structural example of FIG. 4 which has two separate memory units.

The data memory unit 44 always contains input data previously written thereinto in the foregoing manner and data in the middle of processing. By using such data stored in the data memory unit 44 or data stored in some of flip chips (one-bit registers) FF11–FF14 in the ALU cell 76, bit-by-bit processing programmed by the ALU 78 can be advanced in sequence.

As an example, an addition instruction cycle, in which data (labeled D1) in a certain memory cell 74 in the data memory unit 44 is added to data (labeled D2) in a different memory cell 74, and the addition result (labeled D3) is written into a further different memory cell 74, will be described below in detail.

First, a read signal $S_{RRAA}$ is outputted to the memory cell 74 in the data memory unit 44 in which the data D1 is stored, and a read signal $S_{RRBA}$ is outputted to the memory cell 74 in which the data D2 is stored, thereby outputting the respective data D1, D2 onto two read bit lines.

In the memory cell 74 which has received the read signal $S_{RRAA}$, a transistor Tr14 is turned ON to output data corresponding to a potential on a capacitor C11 onto one of the bit lines. In the memory cell 74 which has received the read signal $S_{RRBA}$, a transistor Tr15 is turned ON to output data corresponding to a potential on a capacitor C11 onto the other bit line.

The data D1, D2 read from the data memory unit 44 are selected in a predetermined path of the selectors SEL11–SEL14 in the ALU array unit 45 and addition is perfored by the ALU 78. The bit line control signal $S_{RBC}$ and its inverted signal $S_{RBC-}$ select the ALU array 45 as in input source for a write bit line to the data memory unit 44, during the addition instruction cycle. Consequently, the result of the processing performed by the ALU 78 is outputted onto the write bit line to the data memory unit 44.

Further, during the same addition instruction cycle, since a write memory access signal $S_{RWA}$ is outputted to a memory cell 74 into which the data D3 into the data memory unit 44 is desirably written, a transistor Tr12 in the memory cell 74 is turned ON so that the capacitor C11 become a potential corresponding to the data D3 outputted from the ALU 78. The operations up to this point constitute the operation instruction cycle for reading the data D1 and D2 from the respective memory cells, adding them, and writing the addition result, i.e., the ALU output data D3 into the memory cell.

The processing operation performed in the ALU cell 76 during this instruction cycle has been specified from the program by an ALU control signal $S_{RALU-CONT}$. In this event, the ALU 78 in the ALU cell 76 is instructed to function as a full adder by the ALU control signal $S_{RALU-CONT}$. Three inputs to the ALU 78 are the data D1, D2 and a carry input. These inputs are selected by the selectors SEL11, SEL12 by switching connection points indicated by "×" with a variety of connection lines.

While the ALU 78 outputs the sum (data D3) and a carry, the selector SEL14 selects the sum. The carry is stored in a flip-flop FF13 for the processing on upper bits in a later cycle.

It should be noted that the carry input refers to the data stored in the flip-flop FF13, i.e., a carry outputted from the ALU in the previous cycle when an addition of lower bits has been performed in the previous cycle. If an addition cycle of interest is the first cycle of the addition operation, i.e., addition of the less significant bit, the flip-flop FF13 has been previously cleared by the ALU control signal $S_{RALU-CONT}$ in a previous cycle.

In this way, the video signal processor 40 reads two data D1, D2 from the data memory 44, performs a required arithmetic operation or logical operation on the read data in the ALU array unit 45, and writes data D3 indicating the operation result into a predetermined address in the data memory unit 44 in accordance with a program during one instruction cycle. It should be noted that the operational processing is all performed on a bit basis, i.e., the processing is advanced one bit per cycle.

When one horizontal scanning period has passed as the processing is advanced as described above, the remaining processing will be taken over to the second block 42 in the configuration of the second embodiment.

Actually, the program control unit 49 is required to terminate previously shared program processing within one horizontal scanning period and to have taken over processing results obtained in the horizontal scanning period and data in the middle of processing to the second block 42 at the end of the program before the horizontal scanning period has passed. Then, the program processing is repeated on data in the next horizontal scanning period after the data in the next horizontal scanning period has been accumulated again in the input SAM unit 43.

In this embodiment, a data transfer for taking over the program processing from the first block 41 to the second block 42 is realized in the following manner using the arbiter circuit 61 illustrated in FIG. 9.

At the time the program control unit 49 has completed previously shared operational processing and so on and is ready to take over processing results to the second block 42, the program control unit 49 sets a flag a and waits for the second block 42 to be get ready to accept the processing results.

In the meantime, the program control unit 50 in turn SIMD controls the data memory unit 46, ALU array unit 47, and output SAM unit 48 to execute predetermined processing every horizontal scanning period of the video signal $D_{IN3}$, similarly to the program control unit 49. Subsequently, at the time the second block 42 is ready to accept data from the first block 41, the program control unit 50 sets a flag b.

As a result, when the flags are both set, the arbiter circuit 61 outputs arbitration signals c, d, i.e., logical AND of the flags a and b, which are supplied to the program control unit 49 and the program control unit 50, respectively.

In this event, the program control unit 49 and the program control unit 50 both monitor the arbitration signal c or d, and start the data transfer processing from the first block 41 to the second block 42. When the transfer is started, the flags a, b are reset.

The data transfer, although separately controlled by individual programs in the first block 41 and the second block 42, is programmed to achieve a completely associative operation, and is executed one bit per cycle. Operations in each cycle are as follows.

First, the first block 41 outputs a memory access signal $S_{RRAA}$ or $S_{RRBA}$ to a memory cell 74 in the data memory unit 44, in which data to be outputted is stored, to execute a read operation. Instructions to pass the read data through the ALU array unit 45, connect the first block 41 and the second block 42, and output the data to a bit line which reaches the data memory unit 44 are executed.

On the other hand, the second block 42 executes instructions, at the timing matching with the operation of the first block 41, to output a memory access signal $S_{TWA}$ to a memory cell 74 in the data memory unit 44 in which the data is to be stored and to write the data into the memory cell 74.

More specifically, in the memory cell 74 which has received the read signal $S_{RRAA}$ or $S_{RRBA}$, a transistor Tr14 or Tr15 is turned ON to output data corresponding to a potential on a capacitor C11 onto one of read bit lines.

At this time, in the ALU array unit 45, an ALU control signal $S_{RALU-CONT}$ which instructs the ALU cell 78 to pass data therethrough without performing any operation on the data is specified from a program. And the input data of the ALU cell 78 is outputted to a bit line to the data memory unit 44.

In the memory cell 75 which has received the write signal $S_{TWA}$, a transistor Tr16 is turned ON so that a capacitor C12 become a potential corresponding to the data from the ALU array unit 45. In this event, the bit control signal $S_{TBC}$ and its inverted signal $S_{TBC-}$ select the first block 41 as an input source for the write bit line to the data memory unit 46.

The data transfer from the first block 41 to the second block 42 is achieved by repeating the foregoing cycle. As described above, data may be passed through the ALU array unit 54 without any processing performed thereon. Alternatively, the last processing cycle of an addition or the like, for example, may be simultaneously executed in the ALU array unit 45. In this case, the operations in the data memory unit 44 and the ALU array unit 45 are the same as those performed in the aforementioned addition of the data D1 and the data D2, so that explanation thereof is omitted.

When the data transfer from the first block 41 to the second block 42 has been completed, the program control unit 49 enters a stand-by state for starting the processing for the next horizontal scanning period. Thereafter, the processor control unit 49 waits for a horizontal scanning synchronization signal Se which is transferred thereto when data in the next horizontal scanning period has been all accumulated in the input SAM unit 43. Upon receiving the signal Se, the program control unit 49 repeats the program which begins with a data transfer from the input SAM unit 43 to the data memory unit 44.

On the other hand, in the program control unit 50, when the data transfer has been completed from the first block 41 to the second block 42, the ALU array unit 47 is operated to start executing a program for finishing off processing, which has been left uncompleted in the first block 41, and so on using the processing results and data in the middle of processing 41 transferred from the first block 41, previous processing results and data in the middle of processing stored in the data memory unit 46, and data stored in some of the one-bit registers FF15–FF18 in the ALU cell 77 of the ALU array unit 47. Then, within one horizontal scanning period until the next data transfer is started from the first block 41 to the second block 42, the program control unit 50 executes a program to complete required processing and transfer data to be outputted to the output SAM unit 48.

In this case, as to processing and so on performed in the program control unit 50 using the ALU array unit 47, since data required for the processing always resides in the data memory unit 46. The data memory unit 46 comprises three-port memories having two read ports. Therefore, required bit-by-bit processing can be sequentially advanced in the ALU 79 using the data stored in the data memory unit 46 or data stored in some of the one-bit registers FF15–FF18, similarly to the processing in the first block 41. Since the processing operations performed by the data memory unit 46 and the ALU array unit 47 are similar to the processing operations performed by the data memory unit 44 and the ALU array unit 45 in the first block 41, detailed description thereon is omitted.

The last transfer of output data to the output SAM unit 48 is carried out by a repetition of the following cycles.

A memory access signal $S_{TRAA}$ or $S_{TRBA}$ is outputted to a memory cell 75 in the data memory unit 46 in which data to be outputted is stored for reading the data from the memory cell 75. Then, the read data is passed through the ALU array unit 47. A write signal $S_{OW}$ is generated to an output SAM cell corresponding to a predetermined bit of the output SAM unit 48 to execute data transfer.

In this case, the data is transferred one bit by one bit through a vertical bit line. In this event, the data passes through the ALU 79 in the data transfer even if the ALU 79 does not perform any processing on the data. Alternatively, the ALU 79 may perform any operation at the last stage. Anyway, a possible operation performed in the ALU 79 in this case is similar to the operation performed in the first block 41 when data is transferred from the first block 41 to the second block 42. Also, a write operation into the output SAM unit 48 is similar to that performed in the structural example of FIG. 1. Therefore, detailed description on the operation at this stage is omitted.

When the data has been transferred to the output SAM unit 48 as described above, the program control unit 50 sets a flag b and enters a stand-by state for waiting a next transfer request from the first block 41. Then, upon receiving an arbitration signal d, the program control unit 50 restarts the program processing from the step at which data transferred from the first block 41 is written into the data memory unit 46.

While in the description so far made, the program control units 49, 50 set the flags a, b only for transmitting and receiving data between the first and second blocks 41, 42, the flags may be set for other purposes.

It should be noted that, in the three-port memory, although collision of two read addresses is allowed, collision of a read address with a write address is not allowed. When a read address is going to collide with a write address, an additional cycle should be used to provide separate cycles for read and write operations.

The operation of each processor element as illustrated in FIGS. 11, 12 is realized under the control of the program control unit 49 in the first block 41, which transfers input data accumulated in the input SAM unit 43 to the data memory unit 44, performs operational processing expected by the first block 41, and transfers required data to the second block 42 within one horizontal scanning period. This is a bit-unit SIMD program control.

Also, in the second block 42, the operation of each processor element is realized under the control of the program control unit 50 which performs operational processing expected by the second block 42, outputs the results to the output SAM unit 48, and accepts data transferred from the first block 41 at the next time within the next horizontal scanning period. This is also a bit-unit SIMD program control.

The above program processing is repeated in the respective first or second block 41 or 42 in units of horizontal scanning period, similarly to the structural example of FIG. 1. Since this embodiment provides the SIMD control, all the processor elements associatively operate to perform the same processing on all pixels (the number of pixels is H) in one horizontal scanning period.

When the video signal processor 40 of this embodiment illustrated in FIGS. 9, 11, 12 is expressed in conformity to a general expression of a processor, it can be said that the video signal processor 40 is composed of a large number of one-bit processors configured as illustrated in FIG. 10 which are arranged in one-dimensional (linear) array.

In this case, in a processor 63 illustrated in FIG. 10, input data is first written into a data memory 53 through a buffer memory 51. Subsequently, the just inputted data written into the data memory 53, previously inputted data, data in the middle of previously performed processing, and so on are selected by two read memory addresses to be led to the ALU 54. By utilizing the data, a certain operation is performed, and the processing result is written again into the data memory 53 for storage. The data generated in the middle of the processing is transferred to the data memory 55.

Also, the just transferred data written into the data memory 5, previously transferred data, data in the middle of previously performed processing, and so on are selected by two read memory addresses to be led to the ALU 56. By utilizing the data, a certain operation is performed, and the processing result is written again into the data memory 55 for storage. The data on the processing results is outputted through the output buffer memory 52.

Thus, in the video signal processor 40 of this embodiment illustrated in FIG. 9, the input SAM unit 43, output SAM unit 48, data memory unit 44, data memory unit 46, ALU array unit 45, and ALU array unit 47 correspond to the input buffer memory 51, output buffer memory 52, data memory 53, data memory 55, ALU 54, and ALU 56 in the processor 63 illustrated in FIG. 10, respectively.

The configuration of the processor 63 is referred to as a linear array type since a large number of small processor elements are arranged in one-dimensional (linear) array. However, the linear arrangement is a mere conceptual expression of the configuration. In an actual physical layout on an LSI, all processor elements are not necessarily arranged along a straight line.

(2-5) Pipe Line Operation in Units of Horizontal Scanning Period

In the case of the video signal processor 40, the following four operations are grouped into a single pipeline operation performed in units of a horizontal scanning period of an input video signal $D_{IN3}$:

1. Input operation for writing input data into the input SAM unit 48;
2. Transfer of input data accumulated in the input SAM unit 43 into the data memory unit 44, operational processing expected by a third block 41, and transfer of required data to a fourth block 42, under the SIMD control of the program control unit 49;
3. Reception of data transferred from the third block 41, operational processing expected by the fourth block 42, and output of the data to the output SAM unit 48 under the SIMD control of the program control unit 50; and
4. Output operation for reading output data $D_{OUT4}$ from the output SAM unit 48.

While the respective operations are executed with a time shift equal to one horizontal scanning period when input data of a particular horizontal scanning period is concerned, these four operations are simultaneously and parallelly advanced in sequence.

While the configurations of the respective cells illustrated in FIGS. 11–15 are highly generalized for facilitating the understanding, it will be understood that many variations can be made to the configurations of the respective cells.

The video signal processor 40 illustrated in FIGS. 9, 11, 12 is equivalent to two processors of the structural example of FIG. 1 serially connected in the vertical direction, except that a redundant output SAM unit in the third block 41 and an input SAM unit in the fourth block 42 are removed, and the data memory unit 44, 46 are improved.

(2-6) Pipe Line Operation in Units of Instruction Cycle

Next, the pipeline processing in units of the instruction cycle will be next described in this embodiment.

In the description on the embodiments so far made, the pipeline processing in units of the horizontal scanning period has been described, however, it has been assumed that the embodiments do not employ pipeline processing in units of the instruction cycle.

However, without the pipeline processing in units of the instruction cycle, significantly faster operations cannot be expected. For example, since one cycle of an addition is made up of the steps of reading data from the data memory units 44, 46, processing the data in the ALU array units 45, 47, and writing the results into the data memory units 44, 46, the operation speed depends on a gate delay of the path, so that extremely fast operation cannot be expected.

Since the performance of a processor is defined by the product of the number of processor units and the speed of their instruction executing cycle, the instruction execution cycle is desirably shortened if the number of processor units is fixed. For this purpose, it is needed to execute the pipeline processing in units of the instruction cycle.

However, since the pipeline processing is a well known technology for providing higher speed operations, explanation thereof is omitted.

First, a two-cycle separation technique is described. When an operation, for example, an addition or the like, is performed, one instruction execution cycle is separated into a first cycle from the reading of data from the data memory 44 to the time before inputting data into the ALU 78 in the ALU array unit 45 and a second cycle up to the writing of data from the ALU 78 to the memory unit 44. For this purpose, the flip-flops $FF_{11}$, $FF_{12}$, $FF_{13}$ in the ALU cell 76 are utilized as pipeline registers. In this way, although double the speed is impossible, slightly less than double the speed can be achieved.

As an alternative two-cycle separation technique, the flip-flop $FF_{14}$ in the ALU cell 76 may be utilized as a pipeline register for separating one instruction execution cycle into a first cycle from the reading of data from the data memory unit 44 to the operation performed on the data in the ALU 78 in the ALU array unit 45 and a second cycle up to the writing of data from the ALU 78 to the data memory unit 44.

Next, a three-cycle separation technique will be described. This technique utilizes the flip-flops $FF_{11}$, $FF_{12}$, $FF_{13}$ in the ALU cell 78 and the flip-flop $FF_{14}$ in the ALU cell 78 as a two-stage pipeline register for separating one instruction execution cycle into a first cycle from the reading of data from the data memory unit 44 to the time before the inputting of the read data into the ALU 78, a second cycle including the processing in the ALU 78, and a third cycle including the writing of processing results from the ALU 78 into the data memory unit 44. In this way, although three-times higher speed is impossible, approximately double the speed is achieved.

While the three cycle separated pipeline processing completes a sequence of operations from data read to data write in three cycles and accordingly causes a time shift of two cycles between the respective operations, the whole processing is made faster. Since the three cycle separated pipeline processing implies a time shift of two cycles, a read address and a write address in a three-port memory must be restricted to avoid collision therebetween in consideration of the time shift.

The problem of the address contention in the three-port memory can be avoided by modifying a program, when it is determined, to shift respective cycles so as to eliminate the write address contention before the program is compiled (or assembled). Alternatively, since it is sufficient to ensure that a different address is accessed in each cycle, different address spaces may be used for respective cycles.

Basically, the problem of the memory address contention, as mentioned above, is apparent when a program is created, so that possible contention can be avoided without fail. In some applications, a compiler or an assembler may be provided with an automatic program modification function to automatically avoid the contention problem instead of a programmer.

While several exemplary operations of the pipeline processing in units of the instruction cycle have been described with reference to the third block 41, the same operations are of course performed in the fourth block 42.

(2-7) Effects of Second Embodiment

According to the configuration described above, the second embodiment of the present invention is structured that the first and second blocks 41, 42, each composed of a multiple parallel DSP processor having a large number of bit processing processor elements arranged in one-dimensional array are connected to supply the output of the ALU array unit 45 in the first block 41 directly to the data memory unit 46 of the second block 42, without providing the output SAM unit in the first block 41 and the input SAM unit in the second block 42. Thereby, the performance can be improved in the vertical direction while removing redundant circuits in the first and second blocks 41, 42, thus making it possible to realize a video signal processor of a simple configuration capable of improving the performance thereof.

Also, the present embodiment is structured that each of the data memory units 45, 47 in the first and second blocks 41, 42 is implemented by a single three-port memory. Consequently, the video signal processor of this embodiment can avoid any restrictions on data processing, which are often required to the structural example of FIG. 1 having two data memory units, for example, input data for processing must have been stored in both of the two memory units. For this reason, the video signal processor can eliminate a data transfer between the two data memory units as a preparation for subsequent processing which has been often needed in the prior art. Also, when processing results are transferred to the output SAM unit, it is not necessary to transfer the processing results between the data memory units for preparation.

Further, the present embodiment is structured that by integrating the data memory units in the respective blocks 41, 42, the blocks 41, 42 are free from the problem of a short or excessive capacity in one of the memory units, which would occur if the respective blocks have two data memory units as before. It is therefore possible to flexibly configure the whole blocks.

Furthermore, since the present embodiment is structured that the read modify write operation is eliminated and the data memory units 44, 46 are implemented by three-port memories having dedicated bit lines, the video signal processor of this embodiment can be readily applied to the pipeline processing in units of the instruction cycle. With these data memory units 44, 46, it is possible to divide the processing path including the reading of two sets of data from the data memory unit 44 or 46, the processing on the data in the ALU 78 or 79 in the ALU array unit 45 or 47, and the writing of processing results into the data memory unit 44 or 46, to reduce the instruction cycle, and to increase the processing speed. In this case, by applying the three-cycle separation pipeline processing as the pipeline processing, approximately double the speed can be achieved.

(2-8) Other Embodiments

While the second embodiment has been described on the assumption that the present invention is applied to a video signal processor, the present invention is not limited to this particular application but can be applied to a variety of other signal processing apparatuses.

For applying the present invention to a signal processing apparatus, a plurality of processor blocks each comprising a multiple parallel digital signal processor having a large number of bit processing processor elements arranged in one-dimensional array may be connected in sequence, wherein the processor block at the first state is composed of serial-to-parallel converting means for converting serial input data into a parallel form, a first storage unit (memory) for storing data, and a first processing unit for processing data. The processor block at the last stage is composed of a second storage unit (memory) for storing data, a second processing unit for processing data, and a parallel-to-serial converting unit for converting parallel data into serial data to be outputted. And other processor blocks are each composed of a third storage unit (memory) for storing data and a third processing unit for processing data. The number of processor blocks to be connected in sequence for building the signal processing apparatus may be three or more. Also, each processor block may have a configuration other than those illustrated in FIGS. 9–15.

Also, in this case of a signal processing apparatus, particularly if input data is bit-parallel and time-series serial image data to be processed in units of horizontal scanning period of the image, the serial-to-parallel converting unit in the processor block at the first stage may be controlled to convert bit-parallel and time-series serial pixel data into bit-serial and time-series parallel pixel data in units of horizontal scanning period of the image; the first - third processing units may be controlled to process the bit-serial and time-series parallel image data in units of horizontal scanning period; and the parallel-to-serial converting unit in the processor block at the last stage may be controlled to convert the bit-serial and time-series parallel image data into bit-parallel and time-series serial image data in units of horizontal scanning period of the image.

Figure 16:
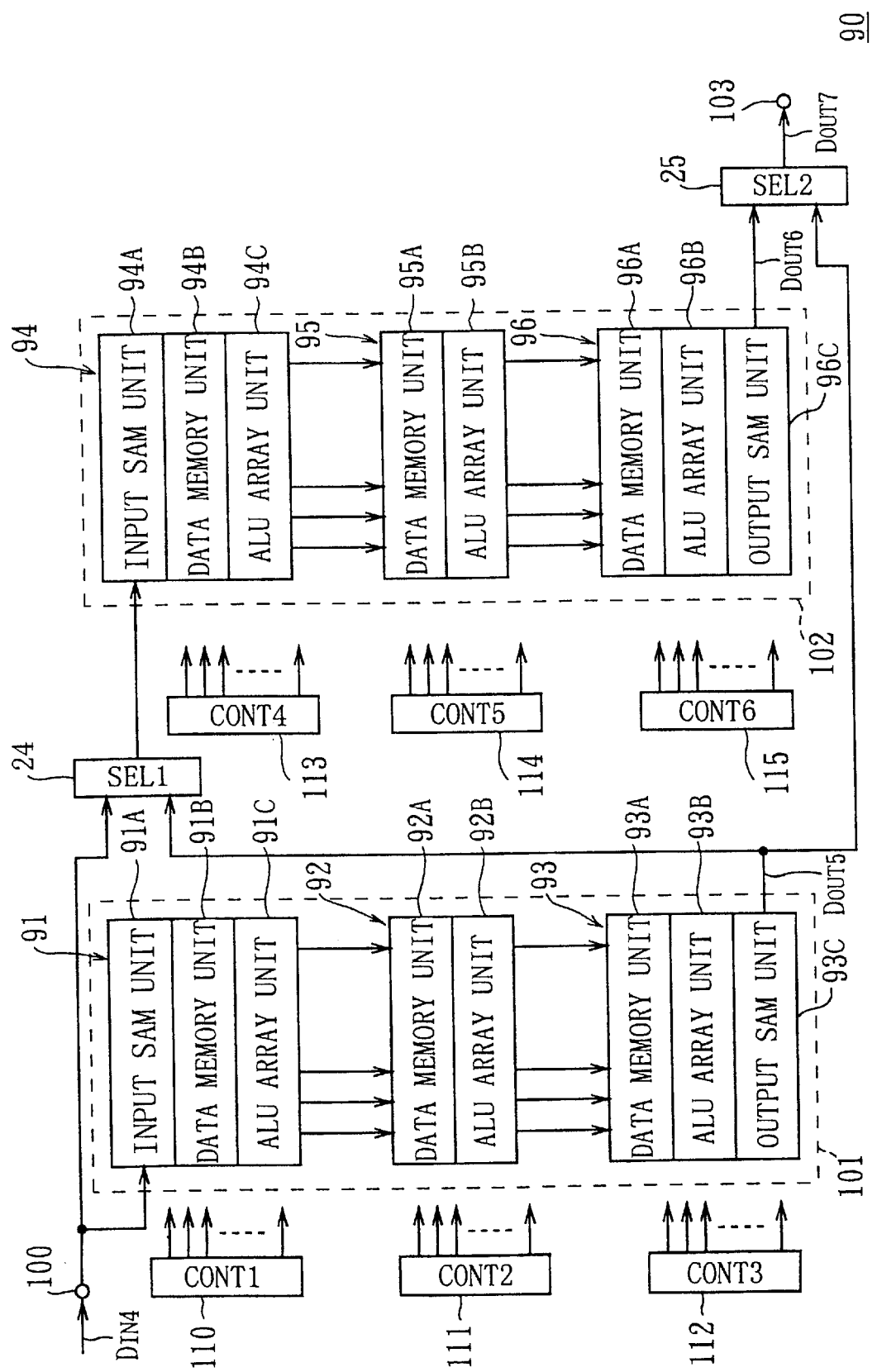
FIG. 16 is a block diagram illustrating the whole configuration of a video signal processor according to the third embodiment of the invention.

(3) Third Embodiment (3-1) Configuration of Video Signal Processor According to Third Embodiment FIG. 16 illustrates a video signal processor 90 according to a third embodiment. This video signal processor 90 is composed of blocks 91–96 each comprising a multiple parallel DSP processor having a large number of bit processing processor elements arranged in one-dimensional array. A total of six blocks 91–96 are arranged in an array having two blocks in the lateral direction and three blocks in the vertical direction.

More specifically, in the video signal processor 90, a signal input terminal 100 is connected to an input terminal of a first block column 101 formed of the first—third blocks 91–94 (corresponding to an input terminal of the first block 91) and to a first switching terminal of a first selector 24. An output terminal of the first block column 101 (corresponding to an output terminal of the third block 93) is connected to a second switching terminal of respective first and second selectors 24, 25.

An output terminal of the first selector 24 is connected to an input terminal of the second block column 102 formed of the fourth—sixth blocks 94–96 (corresponding to an output terminal of the fourth block 94). An output terminal of the second block column 102 (corresponding to an output terminal of the sixth block 96) is connected to a first switching terminal of the second selector 25 which has an output terminal connected to a signal output terminal 103.

In the video signal processor 90 thus configured, an output SAM unit in the first block 91 and an input SAM unit in the second block 92 are removed in the connection between the first and second blocks 91, 92. An output SAM unit in the second block 91 and an input SAM unit in the third block 93 are removed in the connection between the second and third blocks 92, 93. Thereby, the connection between the first and second blocks 91, 92 and the connection between the second and third blocks 92, 93 are respectively made similarly to the connection between the first and second blocks 41, 42 in FIGS. 9, 11, 12.

Similarly, in the video signal processor 90, an output SAM unit in the fourth block 94 and an input SAM unit in the fifth block 95 are removed in the connection between the fourth and fifth blocks 94, 95. An output SAM unit in the fifth block 95 and an input SAM unit in the six block 96 are removed in the connection between the fifth and sixth blocks 95, 96. The connection between the fourth and fifth blocks 94, 95 and the connection between the fifth and sixth blocks 95, 96 are respectively made similarly to the connection between the first and second blocks 41, 42 in FIGS. 9, 11, 12.

Within first—sixth program control units 110–115 for controlling the first—sixth blocks 91–96, an arbiter circuit (not shown) formed in a manner similar to the arbiter circuit 61 of FIG. 9 is provided between the first and second program control units 110, 111; between the second and third program control units 111, 112; between the fourth and fifth program control units 113, 114; and between the fifth and sixth program control unit 114, 115, respectively. Thus, the first and second program control units 110, 111, the second and third program control units 111, 112; the fourth and fifth program control units 112, 113; the fourth and fifth program control units 113, 114; and the fifth and sixth program control units 114, 115 are allowed to timely transfer data in parallel by coordination of the associated arbiter circuits.

Thus, since the video signal processor 90 of the third embodiment is extended in the lateral direction in the same manner as the first embodiment and in the vertical direction in the same manner as the second embodiment, six-times higher performance is ensured without increasing the hardware scale by a factor of six by removing redundant portions, thus making it possible to support a variety of image formats without useless processing or useless hardware.

In the third embodiment, input SAM units 91A, 94A in the first and fourth blocks 91, 94 are configured similarly to the input SAM unit 43 (FIG. 9) in the first block 41 of the second embodiment. Data memory units 91B, 92A, 93A, 94B, 95A, 96A in the first—sixth blocks 91–96 are configured similarly to the data memory units 44, 46 (FIG. 9) of the second embodiment; ALU array units 91C, 92B, 93B, 94C, 95B, 96B are configured similarly to the ALU array units 45, 47 (FIG. 9) of the second embodiment; and an output SAM unit 96C of the sixth block 96 is configured similarly to the output SAM unit 48 in the second block 42 of the second embodiment.

With the configuration described above, the video signal processor 90 can produce similar effects to those described above in connection with the second embodiment in each of the first and second block columns 101, 102.

(3-2) Effects of Third Embodiment

According to the configuration described above, the first—third blocks 91–93 and the fourth—sixth blocks 94–96, each comprising a multiple parallel processor having a large number of bit processing processor elements arranged in one-dimensional array, are parallelly configured in the vertical direction, while removing excessive input SAM units and output SAM units to eliminate the redundancy, to form the first and second block columns 101, 102. In addition, the first and second block columns 101, 102 are structured that are connected to extend in the lateral direction through the first and second selectors 24, 25 in a manner similar to the first embodiment. It is therefore possible to realize the highly versatile and simple video signal processor 90 having high performance which can practically support a variety of image formats in a simple configuration.

(3-3) Other Embodiments

While the third embodiment has been described on the assumption that the present invention is applied to a video signal processor, the present invention is not limited to this particular application but can be applied to a variety of other signal processing apparatuses.

Also, while the third embodiment has been described for the case where the six blocks 91–96, each comprising a multiple parallel processor having a large number of bit processing processor elements of a one-dimensional array, are arranged in an array having two blocks in the lateral direction and three blocks in the vertical direction for a parallel configuration, the present invention is not limited to this particular parallel configuration. Any arbitrary numbers may be applied to the numbers of blocks arranged in the lateral direction and in the vertical direction.

Further, the third embodiment has been described in the case where the input SAM units 91A, 94A in the first and fourth blocks 91, 94 are configured similarly to the input SAM unit 43 (FIG. 9) in the first block 41 of the second embodiment; the data memory units 91B, 92A, 93A, 94B, 95A, 96A in the first—sixth blocks 91–96 are configured similarly to the data memory units 44, 46 (FIG. 9) of the second embodiment. Further, the ALU array units 91C, 92B, 93B, 94C, 95B, 96B in the first—sixth blocks 91–96 are configured similarly to the ALU array units 45, 47 (FIG. 9) of the second embodiment; and the output SAM unit 96C of the sixth block 96 is configured similarly to the output SAM unit 48 in the second block 42 of the second embodiment. However, the present invention is not limited to this configuration, and each bit processing processor element may have any other configuration.

As described above, a signal processing apparatus according to a first invention is structured that comprises a plurality of processor blocks, each of the processor blocks including a multiple parallel digital signal processor having bit processing processor elements arranged in one-dimensional array, wherein a processor block at a subsequent stage is supplied either with an output of a processor block at a previous stage or with input data, and one of outputs of the processor blocks is outputted as a final output. Thereby, it makes possible to improve the performance of the signal processing apparatus by the action of the number of parallel processor blocks in the lateral direction, as well as to significantly enhance the capability of supporting a variety of image formats having different numbers of pixels in one horizontal scanning period, to largely reduce the redundancy, and to deal with a variety of data processing procedures. It will therefore be appreciated that the invention can realize a signal processing apparatus with higher performance, versatility, and simple configuration.

A signal processing apparatus according to a second invention comprises a processor block column formed of a plurality of processor blocks connected in sequence, each of the processor block including a multiple parallel digital signal processor having bit processing processor elements arranged in one-dimensional array. The processor block at the first stage is formed of a serial-to-parallel converting unit for converting input data from a serial form to a digital form, a first storage unit for storing data, and a first processing unit for processing data, the processor block at the last stage is formed of a second storage unit for storing data, a second processing unit for processing data, and a parallel-to-serial converting unit for converting data from a parallel form to a digital form and for outputting converted data. And each of the other processor blocks is structured that is formed of a third storage unit for storing data and a third processing unit for processing data. Thereby, it makes possible to improve the performance of the signal processing apparatus by the action of the number of parallel processor blocks in the vertical direction, as well as to remove redundant circuits in the processor blocks to reduce the hardware scale. It will therefore be appreciated that the invention can realize a signal processing apparatus with higher performance, versatility, and simple configuration.

Further, a signal processing apparatus according to a third invention is structured that processor block columns each comprising a plurality of processor blocks configured as the second invention are connected in a manner similar to the first invention. Thereby, it makes possible to realize a signal processing apparatus having higher performance, versatility, and simple configuration.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An apparatus for processing input digital data, said apparatus comprising:
    a first processor block comprising;
        (a) an input serial access memory unit for receiving an input digital data signal,
        (b) a first data memory unit for receiving the input data signal from said input serial access memory unit, and
        (c) a first one-dimensional array of arithmetic logic units for receiving said input data signal from said first data memory, processing said input data signal and outputting a processed data signal;
    a second processor block comprising;
        (i) a second data memory unit for receiving said processed data signal from said first array of logic units,
        (ii) a second one-dimensional array of arithmetic logic units for receiving said processed data signal from said second memory unit, and
        (iii) an output serial access memory unit for receiving said processed signal from said second array of logic units and for outputting said processed signal.

2. The apparatus for processing data of claim 1, further comprising:
    a first program control unit controlling said first processor block; and
    a second program control unit controlling said second processor block.

3. The apparatus for processing data of claim 2, further comprising an arbiter circuit for connecting said first and second program control units and for providing communication therebetween.

4. The apparatus for processing data of claim 3, wherein said arbiter circuit comprises an AND circuit connected to said first and second program control units, when both of said first and second program control units output a flag to said AND circuit indicating completion of a processing cycle, said AND circuit triggers transmission of data between said first and second processor blocks.

5. The apparatus for processing data of claim 1, wherein each of said first and second data memory units comprise a one-dimensional array of memory elements, each memory element corresponding to a logic unit in said first or second logic unit arrays, respectively.

6. The apparatus for processing data of claim 5, wherein each of said memory elements has three input ports and two output ports such that two reading operations and one writing operation can be performed in a single cycle.

7. The apparatus for processing data of claim 1, further comprising first and second selectors, wherein:
    said first selector selectively couples said processed data signal from said first array of logic units to said first data memory unit;
    said second selector selectively couples said processed signal from said first array of logic units to said second data memory unit; and
    said second selector selectively couples an output signal from said second array of logic units to said second data memory unit.

8. An apparatus for processing input digital data, said apparatus comprising:
    an input terminal to receive input digital data to be processed;
    an output terminal to output processed data;
    a first processor column having an input connected to said input terminal, said first processor column comprising three separate one-dimensional arrays of arithmetic logic units for processing data; and
    a second processor column, said second processor column comprising three separate one-dimensional arrays of arithmetic logic units for processing data;
    a first selector; and
    a second selector;
    wherein an output of said first processor column is selectively connected to said output terminal through said second selector and to an input of said second processor column through said first selector;
    wherein said input of said second processor column is selectively connected to said input terminal through said first selector; and
    wherein an output of a said second processor column is selectively connected to said output terminal through said second selector.

9. The apparatus of claim 8, wherein each of said processor columns comprises three processor blocks each of which comprises one of said logic unit arrays.

10. The apparatus of claim 9, wherein a first of said three processor blocks is connected to the input of said first or second processor column, respectively, and comprises:
    an input serial access memory unit;
    a first data memory unit; and
    one of said logic unit arrays;
    wherein said input serial access memory unit is connected between said input of said respective processor column and said first data memory unit, and said logic unit array of said first block is connected between said data memory unit and an output of said first processor block.

11. The apparatus of claim 10, wherein a second of said three processor blocks comprises:
    a second data memory unit connected between an output of said first block and a logic unit array of said second processor block, said logic unit array of said second processor block being connected to an output of said second processor block.

12. The apparatus of claim 11, wherein a third of said three processor blocks comprises:
    a third data memory unit;
    one of said logic unit arrays; and
    an output serial access memory unit;
    wherein said third data memory unit is connected to an output of said second processor block, said logic unit array of said third processor block being connected between said third memory data unit and said output serial access memory unit, and said output serial access memory unit being connected to an output of said respective processor column.

13. The apparatus of claim 9, further comprising six separate program control units each of which controls one of said processor blocks.

* * * * *